(12) United States Patent
Kim et al.

(10) Patent No.: US 11,743,815 B2
(45) Date of Patent: Aug. 29, 2023

(54) METHOD AND DEVICE FOR WIRELESS NODE COMMUNICATION IN WIRELESS COMMUNICATION SYSTEM

(71) Applicant: Samsung Electronics Co., Ltd., Gyeonggi-do (KR)

(72) Inventors: Sangbum Kim, Gyeonggi-do (KR); Soenghun Kim, Gyeonggi-do (KR)

(73) Assignee: Samsung Electronics Co., Ltd

( * ) Notice: Subject to any disclaimer, the term of this patent is extended or adjusted under 35 U.S.C. 154(b) by 66 days.

(21) Appl. No.: 17/264,059

(22) PCT Filed: Aug. 6, 2019

(86) PCT No.: PCT/KR2019/009807
§ 371 (c)(1),
(2) Date: Jan. 28, 2021

(87) PCT Pub. No.: WO2020/032544
PCT Pub. Date: Feb. 13, 2020

(65) Prior Publication Data
US 2021/0289438 A1    Sep. 16, 2021

(30) Foreign Application Priority Data

Aug. 7, 2018 (KR) .................. 10-2018-0092097
Jan. 31, 2019 (KR) .................. 10-2019-0012823

(51) Int. Cl.
*H04W 48/02* (2009.01)
*H04W 48/20* (2009.01)
(Continued)

(52) U.S. Cl.
CPC .......... *H04W 48/20* (2013.01); *H04W 48/16* (2013.01); *H04W 88/14* (2013.01); *H04W 84/042* (2013.01)

(58) Field of Classification Search
CPC ..... H04W 48/20; H04W 48/16; H04W 88/14; H04W 84/042; H04W 48/02; H04W 48/14; H04W 24/02; H04W 48/08
See application file for complete search history.

(56) References Cited

U.S. PATENT DOCUMENTS 9,860,824 B2   1/2018 Kim et al.
10,003,996 B2  6/2018 Rajadurai et al.
(Continued)

FOREIGN PATENT DOCUMENTS

KR     20100057099 A  *  5/2010
KR     1020140140595      12/2014
(Continued)

OTHER PUBLICATIONS

InterDigital Inc., "Open Issues on NAS/AS Interaction Related to Wait Timer", R2-1809602, 3GPP TSG-RAN WG2 NR AH1807 Meeting, Jul. 2-6, 2018, 4 pages.
(Continued)

*Primary Examiner* — Said M Elnoubi
(74) *Attorney, Agent, or Firm* — The Farrell Law Firm, P.C.

(57) ABSTRACT

A method, performed by a terminal, of performing an access control on a network in a wireless communication system, includes: triggering, by an access stratum (AS) layer, an access to the network; determining, by the AS layer, whether a barring timer for an access category corresponding to the triggered access is running; and in response to the barring timer expiring, determining, by the AS layer, that barring for the access category is alleviated.

12 Claims, 14 Drawing Sheets

(51) Int. Cl.
*H04W 48/16* (2009.01)
*H04W 88/14* (2009.01)
*H04W 84/04* (2009.01)

(56) References Cited

U.S. PATENT DOCUMENTS

2017/0041854 A1* 2/2017 Kim .................. H04W 28/0289
2018/0109992 A1  4/2018 Lee et al.

FOREIGN PATENT DOCUMENTS

KR  1020160128342    11/2016
WO  WO-2019161544 A1 *  8/2019

OTHER PUBLICATIONS

Ericsson, "[E114][E118][E169] Barring Alleviation and Timer T302", R2-1809677, 3GPP TSG-RAN WG2 AH 1807, Jul. 2-6, 2018, 4 pages.
International Search Report dated Nov. 27, 2019 issued in counterpart application No. PCT/KR2019/009807, 18 pages.

* cited by examiner

METHOD AND DEVICE FOR WIRELESS NODE COMMUNICATION IN WIRELESS COMMUNICATION SYSTEM

PRIORITY

This application is a National Phase Entry of PCT International Application No. PCT/KR2019/009807 which was filed on Aug. 6, 2019, and claims priority to Korean Patent Application Nos. 10-2018-0092097 and 10-2019-0012823, which were filed on Aug. 7, 2018 and Jan. 31, 2019, the content of each of which is incorporated herein by reference.

TECHNICAL FIELD

The present disclosure relates to a wireless communication system, and relates to a method and apparatus for smoothly providing a service in a wireless communication system. More particularly, the present disclosure relates to a method and apparatus for transmitting and receiving data by a wireless node of a wireless communication system.

BACKGROUND ART

To meet the increase in demand with respect to wireless data traffic after the commercialization of $4^{th}$ generation (4G) communication systems, considerable efforts have been made to develop pre-$5^{th}$ generation (5G) communication systems or 5G communication systems. This is one reason why '5G communication systems' or 'pre-5G communication systems' are called 'beyond 4G network communication systems' or 'post long-term evolution (LTE) systems.' The 5G communication system defined in 3GPP is referred to as a new radio (NR) system. In order to achieve a high data rate, 5G communication systems are being developed to be implemented in a super-high frequency band (millimeter wave (mmWave)), e.g., a band of 60 GHz. In order to reduce the path loss of radio waves in such a super-high frequency band and to increase a transmission distance of radio waves in 5G communication systems, various technologies are being studied, for example: beam-forming, massive multiple-input multiple-output (MIMO), full dimensional MIMO (FD-MIMO), array antennas, analog beam-forming, and large-scale antennas, and have been applied to NR systems. In order to improve system networks for 5G communication systems, various technologies have been developed, e.g., evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation. Also, for 5G communication systems, other technologies have been developed, e.g., hybrid frequency-shift keying (FSK) and quadrature amplitude modulation (QAM) (FQAM) and sliding window superposition coding (SWSC), which are advanced coding modulation (ACM) schemes, and filter bank multi carrier (FBMC), non-orthogonal multiple access (NOMA) and sparse code multiple access (SCMA), which are advanced access schemes.

The Internet has evolved from a human-based connection network, where humans create and consume information, to the Internet of things (IoT), where distributed configurations, such as objects, exchange information with each other to process the information. Internet of everything (IoE) technology is emerging, in which technology related to the IoT is combined with, for example, technology for processing big data through connection with a cloud server. In order to implement the IoT, various technological components are required, such as sensing technology, wired/wireless communication and network infrastructures, service interface technology, security technology, etc. In recent years, technologies including a sensor network for connecting objects, machine to machine (M2M) communication, machine type communication (MTC), etc. have been studied. In the IoT environment, intelligent Internet technology services may be provided to collect and analyze data obtained from objects connected to each other to create new value in human life. As existing information technology (IT) techniques and various industries converge and combine with each other, the IoT may be applied to various fields, such as smart homes, smart buildings, smart cities, smart cars or connected cars, smart grids, health care, smart home appliances, high quality medical services, etc.

Various attempts are being made to apply 5G communication systems to the IoT network. For example, 5G communication such as sensor networks, M2M communication, MTC, etc., are being implemented by using techniques such as beam-forming, MIMO, array antennas, etc. The application of cloud radio access network (RAN) as a big data processing technology described above may be an example of convergence of 5G communication technology and IoT technology.

As described above, various services are able to be provided due to the development of mobile communication systems, and thus, there is need for methods of effectively providing such services.

DESCRIPTION OF EMBODIMENTS

Technical Problem

Provided are an apparatus and method for effectively providing a service in a mobile communication system.

Solution to Problem

A method, performed by a terminal, of performing an access control on a network in a wireless communication system, according to an embodiment may include: triggering, by an access stratum (AS) layer, an access to the network; determining, by the AS layer, whether a barring timer for an access category corresponding to the triggered access is running; and in response to the barring timer expiring, determining, by the AS layer, that barring for the access category is alleviated.

Advantageous Effects of Disclosure

According to a method, performed by a terminal, of performing an access control, according to an embodiment, the access control of the terminal with respect to a network may be efficiently performed.

BEST MODE

Figure 1:
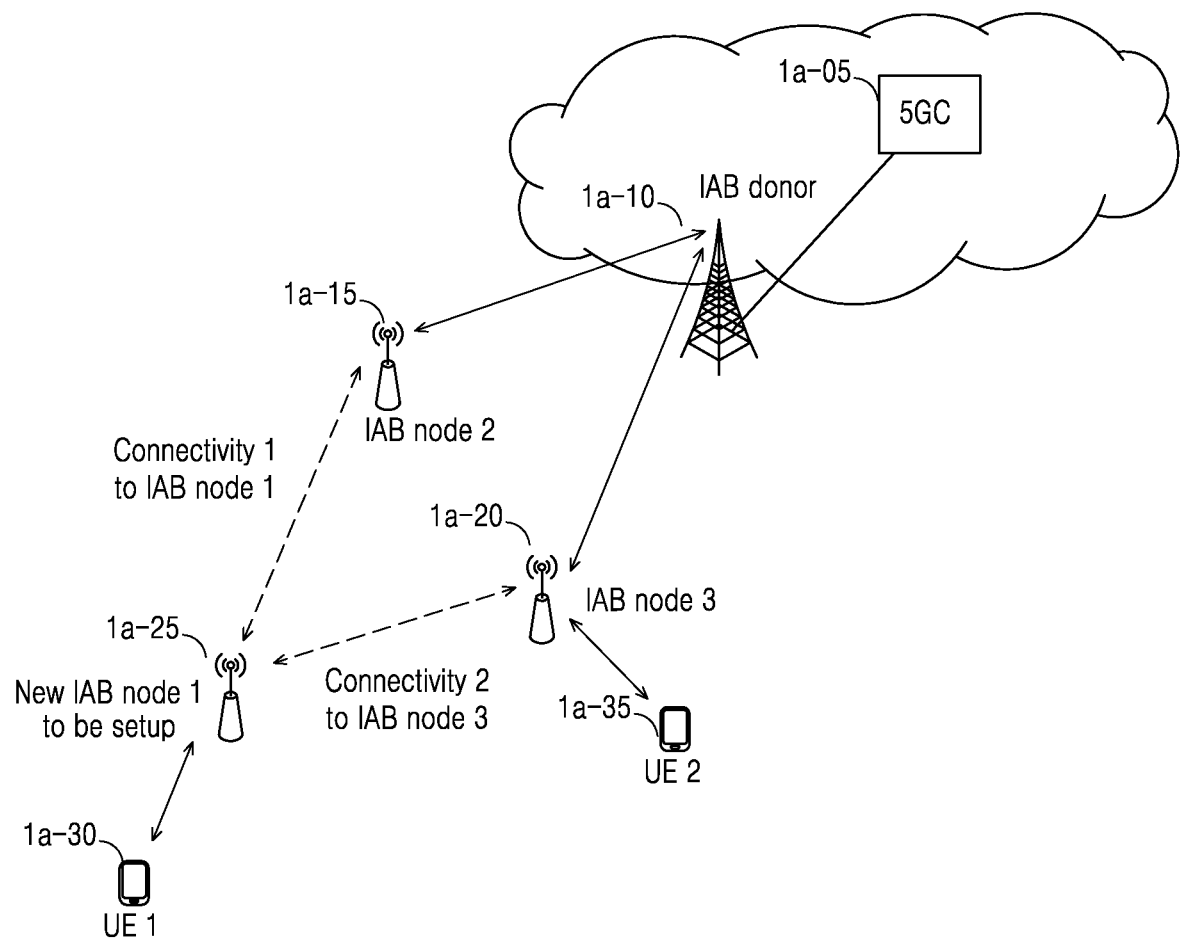
FIG. 1 is a diagram showing an integrated access and backhaul (IAB) node to which an embodiment is applied.

A method, performed by a terminal, of performing an access control on a network in a wireless communication system, according to an embodiment may include: triggering, by an access stratum (AS) layer, an access to the network; determining, by the AS layer, whether a barring timer for an access category corresponding to the triggered access is running; and in response to the barring timer expiring, determining, by the AS layer, that barring for the access category is alleviated.

MODE OF DISCLOSURE

Hereinafter, embodiments of the present disclosure will be described with reference to accompanying drawings. In describing the embodiments, descriptions of technical contents that are well known in the technical field to which the present disclosure belongs and are not directly related to the present disclosure will be omitted. By omitting the unnecessary description, the gist of the present disclosure may be more clearly conveyed without obscuring the subject matter.

For the same reasons, components may be exaggerated, omitted, or schematically illustrated in drawings for clarity. Also, the size of each component does not completely reflect the actual size. In the drawings, like reference numerals denote like elements.

Advantages and features of the present disclosure and methods of accomplishing the same may be understood more readily by reference to the following detailed description of the embodiments and the accompanying drawings. In this regard, the embodiments of the present disclosure may have different forms and should not be construed as being limited to the descriptions set forth herein. Rather, these embodiments are provided so that the present disclosure will be thorough and complete and will fully convey the concept of the present disclosure to one of ordinary skill in the art, and the present disclosure will only be defined by the appended claims. Throughout the specification, like reference numerals denote like elements.

Here, it will be understood that combinations of blocks in flowcharts or process flow diagrams may be performed by computer program instructions. Because these computer program instructions may be loaded into a processor of a general-purpose computer, a special purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated successively may actually be executed substantially concurrently, or the blocks may sometimes be performed in a reverse order according to the corresponding function.

Here, the term "unit" in the embodiments means a software component or hardware component such as a field-programmable gate array (FPGA) or an application-specific integrated circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units". Furthermore, the components and "units" may be embodied to reproduce one or more central processing units (CPUs) in a device or security multimedia card. Also, in the embodiments, the "unit" may include at least one processor.

FIG. 1 is a conceptual diagram of configuring an integrated access and backhaul (IAB) node to which an embodiment is applied.

A mobile communication network according to an embodiment includes a plurality of base stations and core network devices. Each base station and core network device may deliver control and data traffic via a wired backhaul interface. IAB is a technology for replacing a wired backhaul role according to an embodiment with wireless backhaul by using a radio access network (RAN) node. The wireless backhaul may eliminate costs and time required to install a wired network to build wired backhaul. Also, it is possible to build a mobile communication network in an area where a service is urgently required, within a relatively short time.

IAB nodes 1a-15, 1a-20, and 1a-25 may denote RAN nodes that act not only as wireless access base stations supporting terminals (user equipments (UEs)) 1a-30 and 1a-35, but also act as wireless backhaul delivering data traffic. According to an embodiment, an IAB node requesting traffic forwarding is referred to as a child IAB node, and an IAB node forwarding requested traffic is referred to as a parent IAB node. One IAB node may be a child, a parent, or both. An IAB donor 1a-10 may denote an RAN node connected to a core network 1a-05 and providing a wireless backhaul function to the IAB nodes 1a-15, 1a-20, and 1a-25. Because the IAB nodes 1a-15, 1a-20, and 1a-25 are not directly connected to the core network 1a-05, the IAB nodes 1a-15, 1a-20, and 1a-25 may be connected to the IAB donor 1a-10 directly or via another IAB node, and may transmit and receive control or data traffic to and from the core network 1a-05 via the IAB donor 1a-10. Each of the IAB nodes 1a-15, 1a-20, and 1a-25 may be connected to terminals located within a service area and transmit transmitted/received data from the IAB donor 1a-10 or to the IAB donor 1a-10.

When the new LAB node 1 1a-25 is generated, the new IAB node 1 1a-25 may determine the adjacent IAB nodes 1a-15 and 1a-20 or the IAB donor 1a-10, and perform a process of connecting to a most suitable node. In the present disclosure, such a process is called an IAB setup process. The present disclosure proposes an embodiment of a detailed process required during the IAB setup process. In particular, according to an embodiment, separate system information for an IAB node is defined, and through this, configuration information of the IAB node may be provided. Also, the present disclosure proposes a separate access control, a separate random access resource, and a separate radio resource control (RRC) signaling for the IAB setup process according to an embodiment.

Figure 2:
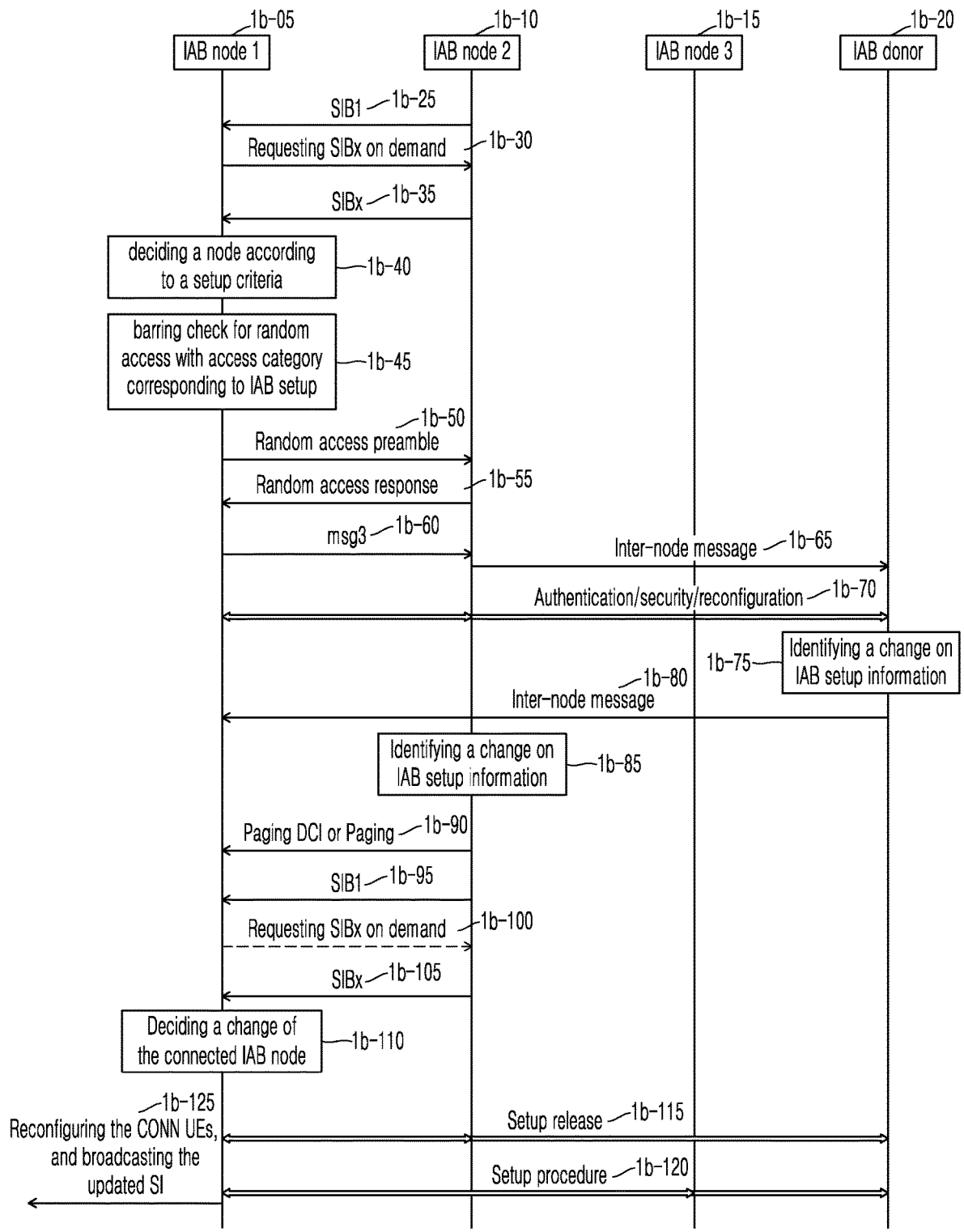
FIG. 2 is a flowchart for describing IAB to which an embodiment is applied.

FIG. 2 is a diagram for describing an operation of IAB to which an embodiment is applied.

An IAB node 1 1b-05 is a newly generated node. Meanwhile, an IAB node 2 1b-10 and an IAB node 3 1b-15 are nodes that completed the IAB setup process. In the current embodiment, as an example, a scenario in which an IAB donor 1b-20 is detected by the IAB node 2 1b-10 and the IAB node 3 1b-15, but not detected by the IAB node 1 1b-05 will be described. Instead, the IAB node 1 1b-05 may detect the adjacent IAB node 2 1b-10 and IAB node 3 1b-15. However, the details of the present disclosure may also be applied to a scenario in which the IAB donor 1b-20 is detected by the IAB node 1 1b-05.

In operation 1b-25, the IAB donor 1b-20, the IAB node 2 1b-10, and the IAB node 3 1b-15 may broadcast IAB-related essential information via system information that is always periodically broadcasted, i.e., a master information block (MIB) or system information block 1 (SIB1). Because the size of information that can be stored in the MIB or SIB1 is limited, the essential information may need to be minimized. The essential information may indicate whether a node providing general information described above supports an IAB function. In an embodiment of the present disclosure, an IAB donor or IAB node may include at least one of pieces of information below as the essential information.

First Information: An indicator indicating whether an IAB function is supported.

Second Information: An indicator indicating whether current IAB connection is possible.

Even when a corresponding cell supports an IAB function, a new IAB node may be prohibited from being added when the cell is already connected to many adjacent IAB nodes or wireless backhaul is congested. In this case, the above indicator is set.

Third Information: Barring configuration information regarding an access for IAB setup.

When a cell is already connected to many adjacent IAB nodes or wireless backhaul is congested, it may be required to control adding of a new IAB node. An access for IAB setup is mapped to a separately-defined access category or access identity, and the corresponding cell may broadcast the barring configuration information regarding the access category or access identity. When the third information is provided, the second information may not be required.

Fourth Information: Capability information of wireless backhaul supportable via a current IAB function.

A new IAB node may have capability expected in terms of latency and a maximum possible data rate when connected to an IAB donor or a specific adjacent IAB node. When the IAB donor or adjacent IAB node provides such a type of information, the information may be used to determine the corresponding node. However, information about the latency or maximum possible data rate may need to be quantized for minimization. An embodiment of the present disclosure proposes an IAB category indicating a specific range of the information about the latency or maximum possible data rate. According to an embodiment, an IAB node supporting up to an X data rate may broadcast an IAB category 1, and an IAB node supporting up to a Y data rate may broadcast an IAB category 2. The latency may be indicated via a separate category in a similar concept, or may be indicated via a category combined with the data rate described above.

Fifth Information: Information about an IAB hop count up to a corresponding cell.

In a new IAB node, a hop count from an IAB donor to an adjacent IAB node may be important. This is because latency is high when the hop count is high. When the new IAB node needs to provide a service with low latency, the new IAB node may not be connected to an adjacent IAB node having a high hop count. Accordingly, the adjacent IAB node may provide information about a hop count. When a hop count is 0, a corresponding node may be an IAB donor.

Sixth Information: An indicator indicating whether a corresponding cell is an IAB node or an IAB donor.

It may also be indicated whether the corresponding node is the IAB node or the IAB donor via the fifth information above. However, because the fifth information indicates the information about a hop count, a plurality of bits may be required. The IAB donor is sufficient only with the sixth information that is a 1-bit indicator. This is advantageous in terms of signaling overhead.

Essential information may have a size that is not small even with the above listed information. Also, there may be additionally required configuration information for an IAB setup process. For example, configuration information actually required for the IAB setup process, such as random access for a purpose of IAB setup, access control (barring), and adaptation layer configuration information. This may be compared with the SIB1 including information indicating an IAB node that broadcasts the SIB1 supports an IAB function. Accordingly, such information may be transmitted via a separate SIBx, instead of the MIB or SIB1 described above.

There is no reason for general terminals to receive the above information. Accordingly, when more specific information is stored in the separate SIBx only for IAB, it is possible to minimize the terminals from reading unnecessary information. According to an embodiment, remaining information excluding an indicator indicating whether an IAB function is supported may all be included in the SIBx.

In operation 1b-30, the new IAB node 1 1b-05 receives the SIB1 from an adjacent cell, and may start a procedure of additionally obtaining the SIBx upon identifying the above-described indicator from the SIB1. The SIB1 may include scheduling information of the SIBx. The SIBx belongs to on-demand SI. In other words, the SIBx is an SIB that may be broadcasted only on demand.

In operation 1b-30, the new IAB node 1 1b-05 may request an adjacent IAB node for the SIBx, via a message 1 (msg1) (an SI request-dedicated preamble) or a message 3 (msg3). However, the SIBx may be periodically transmitted according to determination of an IAB node. IAB nodes receive the SIBx according to the scheduling information obtained from the SIB1, and a general terminal may not receive the SIBx. The SIBx may include following information.

Second Information: An indicator indicating whether current IAB connection is possible.
See the above description.
Third Information: Barring configuration information regarding an access for IAB setup.
See the above description.
Fourth Information: Capability information of wireless backhaul supportable via a current IAB function. See the above description.
Fifth Information: Information about an IAB hop count up to a corresponding cell. See the above description.
Sixth Information: An indicator indicating whether a corresponding cell is an IAB node or an IAB donor. See the above description.
Seventh Information: Configuration information for determining an adjacent IAB node to be connected.

When a new IAB node is to be connected to an adjacent IAB node, the new IAB node needs to be located within a service area of the adjacent IAB node. Accordingly, an equation similar to S criteria for existing cell selection or reselection may be required. The seventh information may include minimum required reference signal received power (RSRP) or reference signal received quality (RSRQ) information for connection to the adjacent IAB node. According to an embodiment, the new IAB node is able to select the adjacent IAB node when an RSRP or RSRQ value obtained by measuring a reference signal of the adjacent IAB node is greater than a minimum required RSRP or RSRQ value, while the RSRP or RSRQ value includes a predetermined correction value. The seventh information may be included in an existing SIB2, SIB3, or SIB4, instead of a separate SIBx for IAB.

Eighth Information: A separate random access resource for IAB setup.

The IAB setup is an operation of configuring an IAB wireless backhaul network, and may have a high importance. Accordingly, a separate random access resource is required for IAB. An embodiment of the present disclosure proposes providing of a separate random access preamble or random access frequency/time resource for IAB.

Ninth Information: Adaptation layer configuration information

Traffic transmission between IAB nodes is performed via a new adaptation layer. Accordingly, an adjacent IAB node may broadcast configuration information for the adaptation layer.

In operation 1b-40, the new IAB node 1 1b-05 may select one adjacent IAB node according to a certain equation. To calculate the equation, necessary information may be broadcasted by the adjacent IAB node by using the system information. The seventh information may correspond thereto. Also, at least one public land mobile network (PLMN) in a PLMN list broadcasted by the IAB node 2 1b-10 via the SIB1 needs to be a PLMN supported by the IAB node 1 1b-05. When none of PLMNs in the PLMN list belongs to a home PLMN (HPLMN) or equivalent HPLMN (EHPLMN) of the IAB node 1 1b-05, the IAB node 1 1b-05 is unable to be connected to the IAB node 2 1b-10.

In operation 1b-40, the new IAB node 1 1b-05 may select the adjacent IAB node 2 1b-10 and determine whether to allow an access by using barring configuration information broadcasted by the adjacent IAB node 2 1b-10. The new IAB node 1 1b-05 may map an access for IAB setup with a separately defined access category or access identity.

In operation 1b-45, the new IAB node 1 1b-05 may perform barring check by using barring configuration information on the access category or access identity, the barring configuration information broadcasted by the adjacent IAB node 2 1b-10.

Hereinafter, the barring check based on the access identity and access category will be described in detail. The access identity may be indication information defined in 3GPP, i.e., specified in the standard document. The access identity may be used to indicate a specific access as in Table 1 below. For example, the access identity may be used to indicate accesses classified from access class 11 to 15, a multimedia priority service (MPS), and a mission critical service (MCS). The access class 11 to 15 may indicate accesses exclusive for business personnel or for public purposes. In Table 1 below, access class information may be information stored in a subscriber identity module/universal subscriber identity module (SIM/USIM) of a terminal or IAB node.

TABLE 1

| Access Identity number | UE configuration |
|---|---|
| 0 | UE is not configured with any parameters from this table |
| 1 (NOTE 1) | UE is configured for Multimedia Priority Service (MPS). |
| 2 (NOTE 2) | UE is configured for Mission Critical Service (MCS). |
| 3-10 | Reserved for future use |
| 11 (NOTE 3) | Access Class 11 is configured in the UE. |
| 12 (NOTE 3) | Access Class 12 is configured in the UE. |
| 13 (NOTE 3) | Access Class 13 is configured in the UE. |

TABLE 1-continued

| Access Identity number | UE configuration |
|---|---|
| 14 (NOTE 3) | Access Class 14 is configured in the UE. |
| 15 (NOTE 3) | Access Class 15 is configured in the UE. |

NOTE 1:
Access Identity 1 is used to provide overrides according to the subscription information in UEs configured for MPS. The subscription information defines whether an override applies to UEs within one of the following categories:
a) UEs that are configured for MPS;
b) UEs that are configured for MPS and are in the PLMN listed as most preferred PLMN of the country where the UE is roaming in the operator-defined PLMN selector list or in their HPLMN or in a PLMN that is equivalent to their HPLMN;
c) UEs that are configured for MPS and are in their HPLMN or in a PLMN that is equivalent to it.
NOTE 2:
Access identity 2 is used to provide overrides according to the subscription information in UEs configured for MCS. The subscription information defines whether an override applies to UEs within one of the following categories:
a) UEs that are configured for MCS;
b) UEs that are configured for MCS and are in the PLMN listed as most preferred PLMN of the country where the UE is roaming in the operator-defined PLMN selector list or in their HPLMN or in a PLMN that is equivalent to their HPLMN;
c) UEs that are configured for MCS and are in their HPLMN or in a PLMN that is equivalent to it.
NOTE 3:
Access Identities 11 and 15 are valid in Home PLMN only if the EHPLMN list is not present or in any EHPLMN. Access Identities 12, 13 and 14 are valid in Home PLMN and visited PLMNs of home country only. For this purpose the home country is defined as the country of the MCC part of the IMSI.

The access category may be classified into two types. For example, one type may be a standardized access category. The category may be a category defined in an RAN level, i.e., specified in the standard document. Accordingly, different business operators may apply the same standardized access category. In the present disclosure, a category corresponding to emergency may belong to the standardized access category. All accesses may correspond to at least one of the standardized access categories.

Another type may be an operator-specific (non-standardized) access category. The above category is defined outside 3GPP, and may not be specified in the standard document. Accordingly, what is meant by one operator-specific access category may differ for each business operator. In other words, characteristics may be the same as a category in existing application-specific congestion control for data communication (ACDC). An access triggered in a terminal nan-access stratum (NAS) may not be mapped to the operator-specific access category. A big difference from the existing ACDC is that the category not only corresponds to an application, but may also correspond to components other than the application, such as a service type, a call type, a terminal type, a user group, a signaling type, a slice type, or a combination thereof. In other words, whether to approve an access for accesses belonging to the other components may be controlled. The access category may be used to indicate a specific access as in Table 2 below. Access categories 0 through 7 may be used to indicate the standardized access category and access categories 32 through 63 may be used to indicate the operator-specific access category.

TABLE 2

| Access Category number | Conditions related to UE | Type of access attempt |
|---|---|---|
| 0 | All | MO signalling resulting from paging |
| 1 (NOTE 1) | UE is configured for delay tolerant service and subject to access control for Access Category 1, which is judged based on relation of UE's HPLMN and the selected PLMN. | All except for Emergency |

TABLE 2-continued

| Access Category number | Conditions related to UE | Type of access attempt |
|---|---|---|
| 2 | All | Emergency |
| 3 | All except for the conditions in Access Category 1. | MO signalling resulting from other than paging |
| 4 | All except for the conditions in Access Category 1. | MMTEL voice |
| 5 | All except for the conditions in Access Category 1. | MMTEL video |
| 6 | All except for the conditions in Access Category 1. | SMS |
| 7 | All except for the conditions in Access Category 1. | MO data that do not belong to any other Access Categories |
| 8-31 | | Reserved standardized Access Categories |
| 32-63 (NOTE 2) | All | Based on operator classification |

NOTE 1:
The barring parameter for Access Category 1 is accompanied with information that define whether Access Category applies to UEs within one of the following categories:
a) UEs that are configured for delay tolerant service;
b) UEs that are configured for delay tolerant service and are neither in their HPLMN nor in a PLMN that is equivalent to it;
c) UEs that are configured for delay tolerant service and are neither in the PLMN listed as most preferred PLMN of the country where the UE is roaming in the operator-defined PLMN select or list on the SIM/USIM, nor in their HPLMN nor in a PLMN that is equivalent to their HPLMN.
NOTE 2:
When there are an Access Category based on operator classification and a standardized Access Category to both of which an access attempt can be categorized, and the standardized Access Category is neither 0 nor 2, the UE applies the Access Category based on operator classification. When there are an Access Category based on operator classification and a standardized Access Category to both of which an access attempt can be categorized, and the standardized Access Category is 0 or 2, the UE applies the standardized Access Category.

A business operator server may provide information (management object (MO)) about the operator-specific access category to the terminal NAS via NAS signaling or application level data transmission. The information may indicate to which element, such as an application, each operator-specific access category corresponds. For example, the access category 32 may specify, in the information, correspondence to an access corresponding to a Facebook application. A base station may use system information to provide, to terminals, a category list providing the barring configuration information, and the barring configuration information corresponding to each category. A terminal may include logical blocks of NAS and access stratum (AS). In the present disclosure, the above terminal may match an IAB node requesting IAB setup.

The terminal NAS may map a triggered access with the one or more access identity and one access category, according to a predetermined rule. In case of an IAB node requesting IAB setup, NAS and AS may not be clearly distinguished like a general terminal. Accordingly, in the IAB node, a predetermined logical block in IAB may map an access related to the IAB setup with one or more access identity and one access category. Such a mapping operation may be performed in all RRC states, i.e., a connected mode (RRC_CONNECTED), an idle mode (RRC_IDLE), and an inactive mode (RRC_INACTIVE). Characteristics of each RRC state may be as follows.

RRC_IDLE:
A UE (terminal) specific DRX may be configured by upper layers;
UE controlled mobility based on network configuration;
The UE:
Monitors a paging channel;
Performs neighboring cell measurements and cell (re-)selection;
Acquires system information.

RRC_INACTIVE:
A UE specific DRX may be configured by upper layers or by RRC layer;
UE controlled mobility based on network configuration;
The UE stores the AS context;
The UE:
Monitors a paging channel;
Performs neighboring cell measurements and cell (re-) selection;
Performs RAN-based notification area updates when moving outside the RAN-based notification area;
Acquires system information.
RRC_CONNECTED:
The UE stores the AS context.
Transfer of unicast data to/from UE.
At lower layers, the UE may be configured with a UE specific DRX;
For UEs supporting CA, use of one or more SCells, aggregated with the SpCell, for increased bandwidth;
For UEs supporting DC, use of one SCG, aggregated with the MCG, for increased bandwidth;
Network controlled mobility, i.e., handover within NR and to/from E-UTRAN.
The UE:
Monitors a paging channel;
Monitors control channels associated with the shared data channel to determine if data is scheduled for it;
Provides channel quality and feedback information;
Performs neighboring cell measurements and measurement reporting;
Acquires system information.

The terminal NAS may transmit, to the terminal AS, the mapped access identity and access category together with a service request.

Upon being provided with information about the access identity or access category together with a message received from the terminal NAS in all RRC states, the terminal AS may perform a barring check operation of determining whether a wireless access is allowed before performing the wireless access caused by the message. In case of the IAB node requesting IAB setup, NAS and AS may not be clearly distinguished like a general terminal. Accordingly, in the IAB node, a predetermined logical block in IAB may perform the barring check on an access related to the IAB setup. Through the barring check operation, when the wireless access is allowed, the IAB node may request a network for RRC connection configuration.

The business operator may desire to allow only a specific service type among accesses corresponding to at least one of access classes 11 through 15. Accordingly, the barring configuration information of the access category may include ac-barringFactor and ac-barringTime.

NAS may be in charge of processes not directly related to the wireless access, i.e., authentication, a service request, and session management, whereas AS may be in charge of processes related to the wireless access. The network may provide management object information to the NAS by using an operation, administration, maintenance (OAM) (a data message of an application level) or NAS message. The information may indicate to which element, such as an application, each operator-specific access category corresponds. The NAS may use the above information to determine to which operator-specific access category the triggered access is mapped. The triggered access may include a new multimedia telephony (MMTel) service (a voice call or video call), short message service (SMS) transmission, new protocol data unit (PDU) session establishment, or existing PDU session change. When a service is triggered, the NAS may map an attribute of the service with a corresponding access identity and access category. The service may not be mapped to any access identity or may be mapped to one or more access identities. Also, the service may be mapped to one access category.

Upon an assumption that the service may be mapped to one access category, the NAS may first identify whether the service is mapped to the operator-specific access category provided in a management object. When the service is not mapped to any operator-specific access category, the NAS may map the service to a corresponding one of the standardized access categories.

Upon an assumption that the service may be mapped to a plurality of access categories, one service may be mapped to one operator-specific access category and one standardized access category. However, when the service is not mapped to any operator-specific access category, the NAS may map the service to a corresponding one of the standardized access categories. In the above mapping rule, an emergency service may be an exception.

The NAS may transmit, to the AS, a new session request or a service request, together with the mapped access identity and access category. The NAS may transmit the new session request in the connected mode or inactive mode, and may transmit the service request in the idle mode. The AS may receive the barring configuration information from the system information broadcasted by the network. An exemplary embodiment of an ASN.1 structure of the barring configuration information is as Table 3 below, and detailed description thereof will be described below.

TABLE 3

```
UAC-BarringPerPLMN-List ::=    SEQUENCE (SIZE (1.. maxPLMN)) OF UAC-BarringPerLMN
UAC-BarringPerPLMN ::=         SEQUENCE {
    plmn-IdentityIndex                      INTEGER (1..maxPLMN),
    uac-ACBarringListType          CHOICE{
        uac-ImplicitACBarringList               SEQUENCE (SIZE (maxAccessCat-1)) OF UAC-Barring
InfoSetIndex,
        uac-ExplicitACBarringList               UAC-BarringPerCatList
    }
}
UAC-BarringPerCatlist ::= SEQUENCE (SIZE (1..maxAccessCat-1)) OF UAC-BarringPerCat
UAC-BarringPerCat ::= SEQUENCE {
    accessCategory                          INTEGER (1..maxAccessCat-1) ,
    uac-barringInfoSetIndex                 UAC-BarringInfoSetIndex
}
UAC-BarringInfoSetIndex ::=              INTEGER (1..maxBarringInfoSet)
UAC-BarringInfoSetList ::= SEQUENCE (SIZE (1..maxBarringInfoSet)) OF UAC-BarringInfoSet
UAC-BarringInfoSet ::= SEQUENCE {
```

TABLE 3-continued

```
uac-BarringFactor            ENUMERATED {
                                 p00, p05, p10, p15, p20, p25, p30, p40,
                                 p30, p60, p70, 975, p80, p85, p90, p95},
uac-BarringTime              ENUMERATED {s4, s8, s16, s32, s64, s128, s256, s512},
uac-BarringForAccessIdentity             BIT STRING (SIZE(7))
}
```

The AS may determine whether the service request is allowed by using the information about the access identity and access category mapped by the NAS, and the corresponding barring configuration information received from the network. In the present disclosure an operation of determining whether the service request is allowed may denote the barring check. The terminal may receive the system information including access control configuration information and store the access control configuration information. The barring configuration information may be provided for each PLMN and for each access category. A BarringPerCatList information element (IE) may be used to provide the barring configuration information of access categories belonging to one PLMN. In this regard, a PLMN identification (ID) and the barring configuration information of each access category may be included in the above IE in a form of a list. The barring configuration information for each access category may include an access category ID (or index), a uac-BarringForAccessIdentity field, a uac-BarringFactor field, and a uac-Barringtime field indicating a specific access category.

The barring check operation may be as follows. First, each bit configuring uac-BarringForAccessidentity may correspond to one access identity. When each bit value is indicated to be '0', an access related to the access identity may be allowed. When at least one of corresponding bits in the uac-BarringForAccessIdentity is '0' for at least one of the mapped access identities, the access may be allowed. Men none of the corresponding bits in the uac-BarringForAccessIdentity is not '0' for at least one of the mapped access identities, additional barring check described below may be performed by additionally using the uac-BarringFactor field. A range of uac-BarringFactor $\alpha$ may be $0 \leq \alpha < 1$. The terminal AS derives one random value rand, wherein $0 \leq \text{rand} < 1$, and may consider that the access is not barred when the random value is smaller than the uac-BarringFactor and consider that the access is barred when not. When it is determined that the access is barred, the terminal AS may delay an access attempt during a certain period of time derived by using an equation below. The terminal AS may start a timer having the above-described time value. In the present disclosure, the timer may be a barring timer.

"$T$barring"=$(0.7+0.6*rand)*$uac-BarringTime. [Equation 1]

When the access is barred, the terminal AS may notify the same to the terminal NAS. Also, when the derived certain period of time expires, the terminal AS may notify the terminal NAS that the access may be requested again (barring alleviation). From this time, the terminal NAS may request the access to the terminal AS again.

According to the predetermined rule described above, when the service request is allowed, the AS may request the network for RRC connection establishment or RRC connection resume, or may transmit data related to a new session.

When it is assumed that a separate access category is defined for the access for IAB setup, the access category may be classified to be one of the standardized access category or the operator-specific access category.

When the new access category corresponding to the access for IAB setup is classified as the operator-defined access category, the information (MO) about the operator-defined access category for the IAB node may be provided from the business operator server via NAS signaling or application level data transmission. The information above may include information about which operator-specific access category number corresponds to the access for IAB setup, as in Tables 1 and 2 above. When the information is not provided to the IAB node, the IAB node may map the access for IAB setup to a predetermined standardized access category. The predetermined access category may denote the standardized access category corresponding to MO-signaling. The IAB node that received a request for IAB setup may broadcast the barring configuration information corresponding to the new operator-specific access category via the system information.

When the new access category corresponding to the access for IAB setup is classified as the standardized access category, it may be pre-specified, in the standard document, to which standardized access category number the access for IAB setup corresponds, as in Tables 1 and 2 above.

The IAB node that received a request for IAB setup may broadcast the barring configuration information corresponding to the new standardized access category via the system information. Generally, one access may be mapped to a plurality of access categories. According to an embodiment, in new radio (NR) access control, when the triggered access is mappable to the operator-specific access category and the standardized access category, the operator-specific access category may be mapped prior to the standardized access category. However, in the present disclosure, even when the access for IAB setup is mappable to a predetermined operator-specific access category and a dedicated standardized access category for IAB access, the IAB node that requests IAB setup may always map to the new standardized access category for IAB setup access.

Meanwhile, a separate access identity may be defined for the access for IAB setup. When the access for IAB setup is triggered, an IAB node that triggers the access for IAB setup may map the access to a new access identity. Also, the access may be mapped to a predetermined access category.

The predetermined access category may denote the standardized access category corresponding to the MO-signaling or a separate new access category for IAB setup. The barring configuration information may be provided for each access category, and may also include bitmap information indicating whether access is allowed for each access identity. The bitmap information may include information about whether a separate access identity is allowed for an access for new IAB setup. When the separate identity is allowed, the access may be considered to be allowed without barring check.

As another option, the IAB node may map the access for IAB setup to an existing access identity. In the present disclosure, the access for IAB setup may be mapped to a specific access identity. When it is considered that an access identity 11 corresponds to for PLMN use, an access identity 12 corresponds to security services, an access identity 13 corresponds to public utilities (e.g., water/gas suppliers), an access identity 14 corresponds to emergency services, and an access identity 15 corresponds to a PLMN staff, the IAB node may map the access for IAB setup to the access identity 11 or 15.

When the access is allowed, the IAB node 1 1*b*-05 may attempt a random access to the selected adjacent IAB node 2 1*b*-10 by using an IAB-dedicated random access preamble. A reason why the separate access category or access identity is defined is to discriminately consider the IAB setup from another access. This is because the IAB setup configures a backhaul network, and thus the priority thereof may be high.

In operation 1*b*-50, the IAB node 1 1*b*-05 may perform random access by using the separate random access preamble for IAB and a random access frequency/time resource. The total number of IAB-dedicated random access preambles may be set identical to the total number of child IAB nodes connectable by the IAB node 2 1*b*-10 as a parent node. The IAB-dedicated random access preamble may not be configured even when the IAB node 2 1*b*-10 indicates, via the system information, that IAB is supported. In this case, the IAB node 1 1*b*-05 may attempt the random access by using a general random access preamble.

In operation 1*b*-55, the IAB node 2 1*b*-10 that received the preamble may transmit, to the IAB node 1 1*b*-05, a random access response (RAR). When the RAR is not received or the received RAR does not include an ID value of the transmitted preamble, the IAB node 1 1*b*-05 may delay retransmission of a preamble for a specific time. The specific time may be derived via a backoff value stored in a medium access control (MAC) PDU. For example, the backoff value may be a value between 0 and 1, and the specific value may be a random value between 0 and the backoff value. In case of a random access for IAB setup, the specific time may be derived by multiplying a scaling value provided via the system information by the stored backoff value.

In operation 1*b*-60, the IAB node 1 1*b*-05 that successfully received the RAR may transmit an msg3. The msg3 may include a predetermined RRC message. The adjacent IAB node 2 1*b*-10 may forward, to the IAB donor 1*b*-20, the received msg3 via a radio resource indicated via the RAR. In the current embodiment, a scenario in which the IAB node 1 1*b*-05 is connected to the IAB donor 1*b*-20 via a single hop, i.e., the IAB node 2 1*b*-10, is described as an example, but the IAB node 1 1*b*-45 may be connected to the IAB donor 1*b*-20 via a plurality of hops. In this case, control or data traffic of the IAB node 1 1*b*-05 may be forwarded to the IAB donor 1*b*-20 sequentially through the plurality of hops.

In operation 1*b*-65, for the forwarding, capsulation or F1 application protocol (F1AP) message may be used in an adaptation layer for each wireless section between hops. The predetermined message may be used to request the IAB donor 1*b*-20 for the IAB setup. An RRCSetupRequest message may be used as the predetermined RRC message. Generally, the RRCSetupRequest message may be used to initialize RRC establishment. The predetermined RRC message may include a cause value indicating that the message is for the IAB setup. According to an embodiment, the RRCSetupRequest message may include an establishment cause value. Here, a new cause value indicating the IAB setup may be defined as new.

Because the size of the msg3 is limited, the new cause value indicating the IAB setup may be unable to be defined. Accordingly, in this case, an existing specific cause value may be used as the establishment cause value of the RRCSetupRequest message for IAB setup. According to an embodiment, highPriorityAccess or MO-signaling may be configured. Alternatively, a cause value or indicator indicating a purpose of IAB setup may be included in an RRCSetupComplete message carried by a message 5 (msg5).

An ID indicating the IAB node 1 1*b*-05 may be included in addition to the cause value indicating the IAB setup. The ID may be used to determine the IAB node 1 1*b*-05 between the IAB node 2 1*b*-10 and the IAB donor 1*b*-20. When connection establishment between the IAB node 1 1*b*-05 and the IAB donor 1*b*-20 is completed, the IAB donor 1*b*-20 may transmit an establishment message that the IAB node 1 1*b*-05 may be supported, to IAB nodes forwarding traffic of the IAB node 1 1*b*-05 or an adjacent IAB node (for example, the IAB node 2 1*b*-10) configuring a direct connection with the IAB node 1 1*b*-05. At this time, the ID may be used.

In operation 1*b*-70, the IAB node 1 1*b*-05 and the IAB donor 1*b*-20 may perform, via a predetermined RRC message, NAS registration/authentication (NAS container of the RRCSetupComplete message) and security configuration (security mode command message/security mode complete message). Accordingly, like a long-term evolution (LTE) system, security may be achieved between the IAB node 1 1*b*-05 and the IAB donor 1*b*-20. On the other hand, from the standpoint of the IAB node 2 1*b*-10 forwarding traffic of the IAB node 1 1*b*-05, authentication for the IAB node 1 1*b*-05 may be required. The traffic of the IAB node 1 1*b*-05 is unable to be continuously forwarded to the IAB donor 1*b*-20 without any authentication or security procedure. Accordingly, when registration, authentication, and security procedures are completed between the IAB node 1 1*b*-05 and the IAB donor 1*b*-20, the IAB donor 1*b*-20 may transmit an indicator that the IAB node 1 1*b*-05 may be continuously supported to the IAB node 2 1*b*-10 forwarding the traffic of the IAB node 1 1*b*-05, via a predetermined message. At this time, the IAB node 2 1*b*-10 may support IAB nodes other than the IAB node 1 1*b*-05. Accordingly, Is for respectively identifying between IAB nodes are required. The ID may be included in an initial RRC message for a setup process by the initial IAB node 1 1*b*-05, or a temporary cell-radio network temporary identifier (C-RNTI) value included in the RAR message by the IAB node 2 1*b*-10 may be used. When the temporary C-RNTI value included in the RAR message is used, the IAB node 1 1*b*-05 may transmit the temporary C-RNTI value included in the RAR message to the IAB donor 1*b*-20 via the IAB node 2 1*b*-10 by including the temporary C-RNTI value to the RRCSetupRequest message. When the IAB node 2 1*b*-10 does not receive the information about support from the IAB donor 1*b*-20 for a predetermined time after the IAB node 1 1*b*-05 attempted the random access for the IAB setup on the LAB node 2 1*b*-10, the IAB node 2 1*b*-10 may release a connection with the IAB node 1 1*b*-05.

Via the above setup process, the IAB node 1 1*b*-05 may configure the wireless backhaul with the IAB donor 1*b*-20 via the IAB node 2 1*b*-10. However, when congestion in a wireless backhaul, a capability change of an IAB node or the IAB donor 1*b*-20, drop/down of an IAB node acting as a hop due to a specific reason, or traffic un-occurrence in a specific wireless backhaul section for a predetermined time occurs, routing for the wireless backhaul may be readjusted or capability or configuration providable in a specific IAB node may be changed. Accordingly, the IAB node or IAB donor 1*b*-20 needs to notify IAB nodes that participate in the wireless backhaul configuration depending on where a change occurred.

When the IAB donor 1b-20 determines that reconfiguration/release is required depending on a predetermined reason in operation 1b-75, the IAB donor 1b-20 may notify the same to IAB nodes that require routing reconfiguration/release via a predetermined RRC message, in operation 1b-80. Also, at this time, configuration information required for the routing reconfiguration/release may also be provided.

In operation 1b-85, when one IAB node configuring the wireless backhaul determines that the routing reconfiguration/release is required according to the predetermined reason, the IAB node may notify the same to the IAB donor 1b-20 via a predetermined RRC message and may notify the same to adjacent IAB nodes associated with the IAB node configuring the wireless backhaul via the predetermined RRC message or system information. Based on an IAB structure, an RRC connection between IAB nodes may be impossibly very limited. Accordingly, the notifying of the IAB routing reconfiguration/release via the system information may be advantageous.

According to an embodiment of the present disclosure, as shown in operation 1b-90, the IAB routing reconfiguration/release may be indicated via paging downlink control information (DCI) or paging. DCI is an L1 message transmitted from a physical downlink control channel (PDCCH) and the paging DCI may be DCI including paging information, in particular, a system information change indicator. The paging DCI of the present disclosure may include an indicator indicating the IAB routing reconfiguration/release, an indicator indicating that the IAB-related system information capable of causing the routing reconfiguration/release is changed, or an indicator indicating that SIB or SI message including the IAB-related system information is changed.

In operations 1b-95 and 1b-105, the IAB node 2 1b-10 may broadcast the changed system information. A child IAB node may need to monitor paging from a parent IAB node according to a predetermined paging frame (PF) and paging occasion (PO).

According to an embodiment, the PF and PO may have following characteristics.

1) Each IAB node has an intrinsic international mobile subscriber identity (IMSI) value, and the PF and PO may be derived by applying parameter values provided by an adjacent IAB node transmitting the IMSI value and paging, 2) The PF and PO may be configured via the system information regardless of IDs of IAB nodes or may be pre-determined, 3) All IAB nodes have the same IMSI value, and the PF and PO are derived by applying the parameter values provided by the adjacent IAB node transmitting the IMSI value and paging.

In 2) and 3), all IAB nodes may have the same PF and PO. Here, the PF may be a radio frame where the PO starts, and the PO may be a plurality of time slots where the paging DCI or paging may be transmitted, i.e., may be a subframe or orthogonal frequency division multiplexing (OFDM) symbol.

Because a general terminal does not need to receive the system information regarding the routing reconfiguration/release, a new P-RNTI dedicated to an IAB node may be defined to indicate the paging DCI or paging. The P-RNTI may use a pre-defined value. The general terminal does not need to decode DCI encoded in the new P-RNTI.

In operation 1b-100, the IAB node that received the paging DCI or paging indicating the IAB routing reconfiguration/release receives SIB1 and may receive SIBx when necessary. The SIBx may be provided in an on-demand manner. According to an embodiment, when the SIB1 received from the adjacent IAB node indicates that IAB is no longer supported via the first information, or indicates that IAB connection is no longer possible via the second information, another adjacent IAB node for supporting the wireless backhaul may be searched for by using the seventh information provided by the SIBx.

In operation 1b-110, the IAB node 1 1b-05 may determine a change of a connected IAB node.

In operation 1b-115, when the IAB node 1 1b-05 determines to release the existing connection to the IAB node 2 1b-10 and establish a new wireless backhaul connection with the other adjacent LAB node 3 1b-15, the IAB node 1 1b-05 may perform a connection release process with the IAB node 2 1b-10 that was connected for the wireless backhaul.

In operation 1b-120, to notify the release, the IAB node 1 1b-05 may transmit MAC CE, L1 signaling, or adaptation layer control message related to the IAB node 2 1b-10. Also, the IAB node 1 1b-05 may transmit, to the IAB donor 1b-20, an RRC message requesting connection release with the IAB node 2 1b-10 and a connection with a new IAB node. The IAB node 1 1b-05 may trigger an IAB setup process in the new adjacent IAB node 3 1b-15.

According to the routing reconfiguration or release, terminals that were transmitting/receiving data to/from the IAB node 1 1b-05 may need to be reconfigured. In operation 1b-125, inter-cell handover may be performed on terminals in the connected mode, forbearer reconfiguration, security reconfiguration, retransmission reconfiguration, reconfiguration or reset of each L2 layer, and the like.

Figure 3:
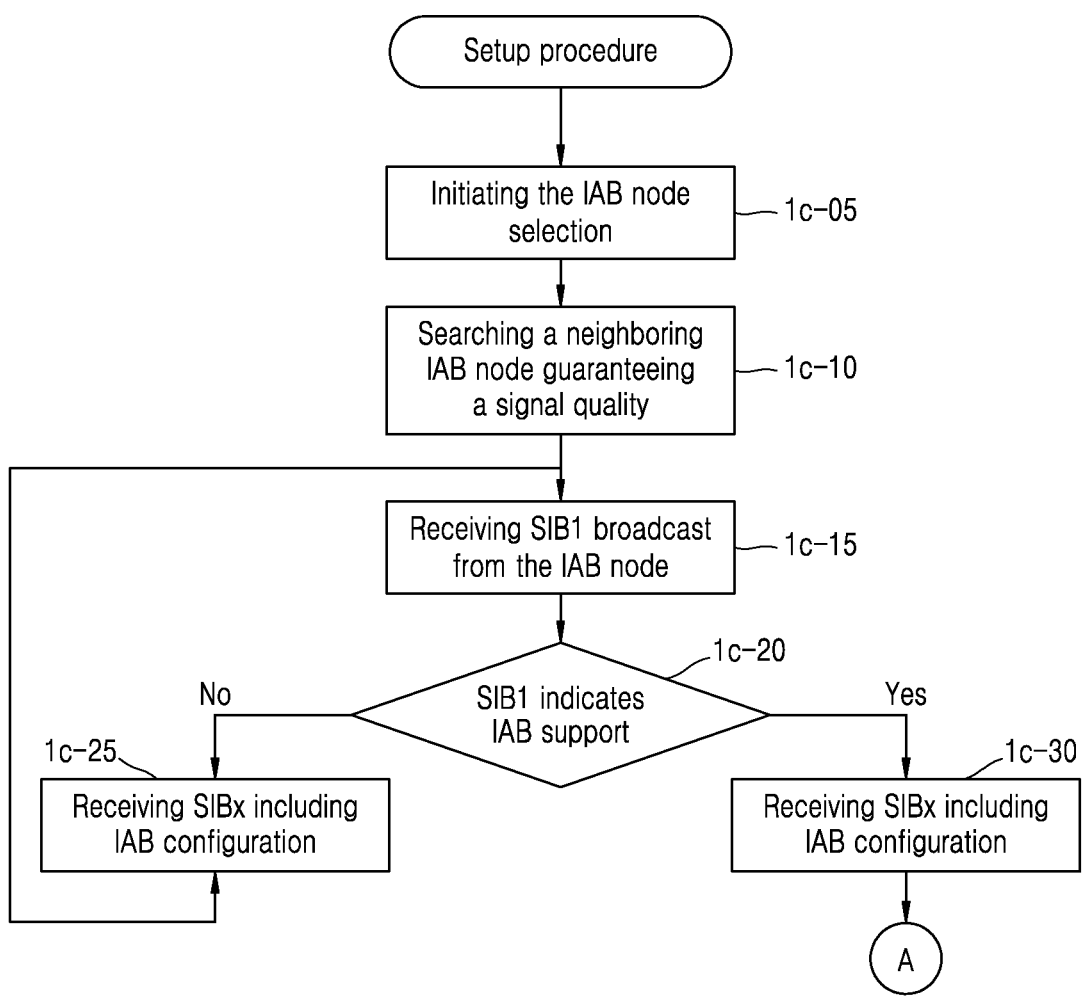
FIG. 3 is a flowchart for describing a method of obtaining system information broadcasted by an adjacent IAB node for IAB configuration, according to an embodiment.

FIG. 3 is a flowchart for describing a method of obtaining system information broadcasted by an adjacent IAB node for IAB configuration, according to an embodiment.

In operation 1c-05, an IAB node may initialize an adjacent IAB node (or IAB donor) selection process for wireless backhaul configuration.

In operation 1c-10, the LAB node may search for an adjacent IAB node or IAB donor satisfying a predetermined signal quality. According to an embodiment, the IAB node may first select an adjacent IAB node providing a highest signal strength. The signal quality may be derived by measuring a single side band (SSB) signal transmitted periodically by the adjacent IAB node. When a signal strength of the IAB donor satisfies a certain signal strength higher, the IAB donor may be selected, rather than the adjacent IAB node. The certain signal strength may be provided or pre-defined via system information.

In operation 1c-15, the IAB node may receive SIB1 from the selected adjacent IAB node (or IAB donor).

In operation 1c-20, the IAB node may determine whether the IAB node is connectable to the adjacent IAB node for wireless backhaul configuration, based on the SIB1. When the SIB1 does not include an indicator (the first information described above) indicating whether an IAB function is supported, a cell does not support IAB. Also, even when the IAB function is supported, when other adjacent IAB nodes are supported with the maximum number of connectable IAB nodes or a network is congested, it is difficult to additionally support the new IAB node. Accordingly, the new IAB node may be suppressed or rejected from requesting IAB connection via the second information or third information. The second information and third information may also be provided via the SIB1. Also, the SIB1 may include scheduling information about SIBx.

In operation 1c-25, when the IAB node determines that connection is not possible, the IAB node may select another adjacent IAB node (or IAB donor).

In operation 1c-30, when the IAB node determines that connection is possible, the IAB node may receive the SIBx including detailed configuration information for wireless backhaul configuration. The SIBx may include configuration information actually required for an IAB setup process, such as random access for a purpose of IAB setup, access control (barring), and adaptation layer configuration information. The SIBx does not need to be always broadcasted periodically, and thus may be provided in an on-demand manner.

Figure 4:
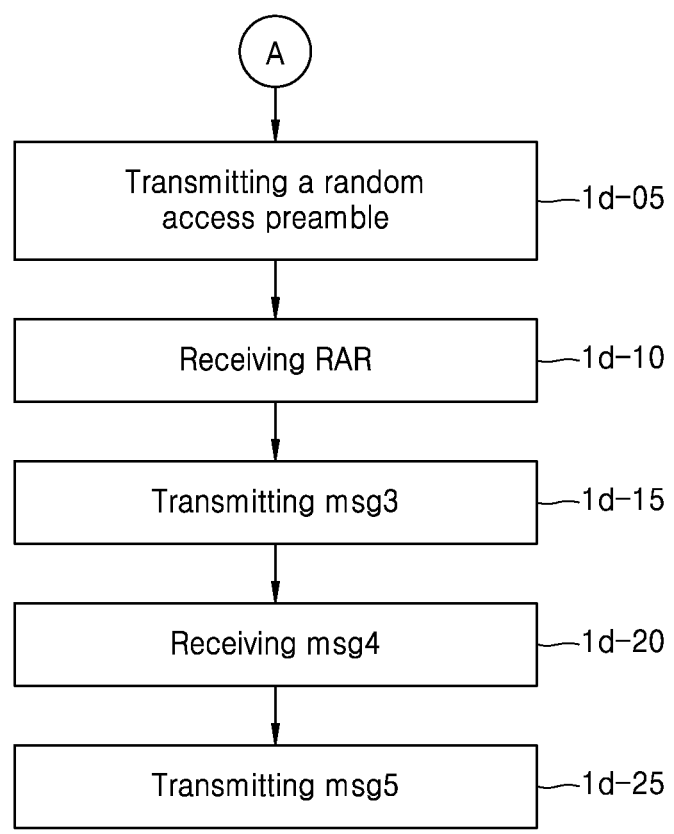
FIG. 4 is a flowchart for describing a method of performing an access to an adjacent IAB node for IAB configuration, according to an embodiment.

FIG. 4 is a flowchart for describing a method of performing an access to an adjacent IAB node for IAB configuration, according to an embodiment.

In operation 1d-05, an IAB node may transmit one random access preamble to a selected adjacent LAB node (or LAB donor). An IAB-dedicated random access preamble may be provided via system information, and otherwise, a general random access preamble may be applied.

In operation 1d-10, the IAB node may receive RAR from the adjacent IAB node.

In operation 1d-15, the LAB node may transmit msg3 by using a radio resource indicated by the RAR. The msg3 may include RRCSetupRequest and an RRC message may include a cause value indicating IAB setup. In the current embodiment, an RRCSetupRequest message for RRC establishment is reused as an example, but a new RRC message for LAB setup may be defined.

In operation 1d-20, the IAB node may receive msg4 from the adjacent IAB node.

In operation 1d-25, the IAB node may transmit msg5. The message may include the cause value indicating the IAB setup. This is because the cause value may not be included in msg3 due to a size limitation of the msg3.

Figure 5:
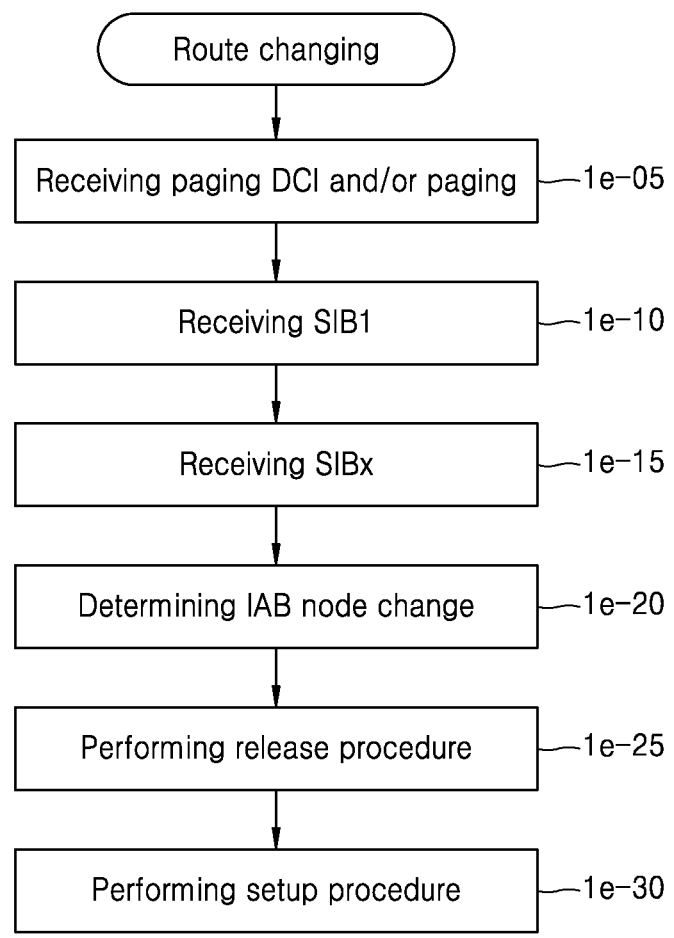
FIG. 5 is a flowchart for describing a method of obtaining changed IAB configuration information, according to an embodiment.

FIG. 5 is a flowchart for describing a method of obtaining changed IAB configuration information, according to an embodiment.

In operation 1e-05, an IAB node may receive paging DCI or paging from an adjacent IAB node configuring IAB.

In operation 1e-10, the IAB node may receive SIB1 from the adjacent IAB node.

In operation 1e-15, the IAB node may receive SIBx from the adjacent IAB node.

In operation 1e-20, the IAB node may determine whether IAB node change/reconfiguration is required via the received SIB1 and SIBx.

In operation 1e-25, the IAB node may perform a process of releasing a connection with the existing adjacent IAB node when the IAB node change is required. The releasing process may be requested by the IAB node to the adjacent IAB node by using a predetermined MAC CE, L1 signaling, or adaptation layer control message, or may be triggered by the adjacent IAB node by using an RRCRelease message.

In operation 1e-30, the IAB node may perform an IAB setup process with another adjacent IAB node after the release process is completed.

Figure 6:
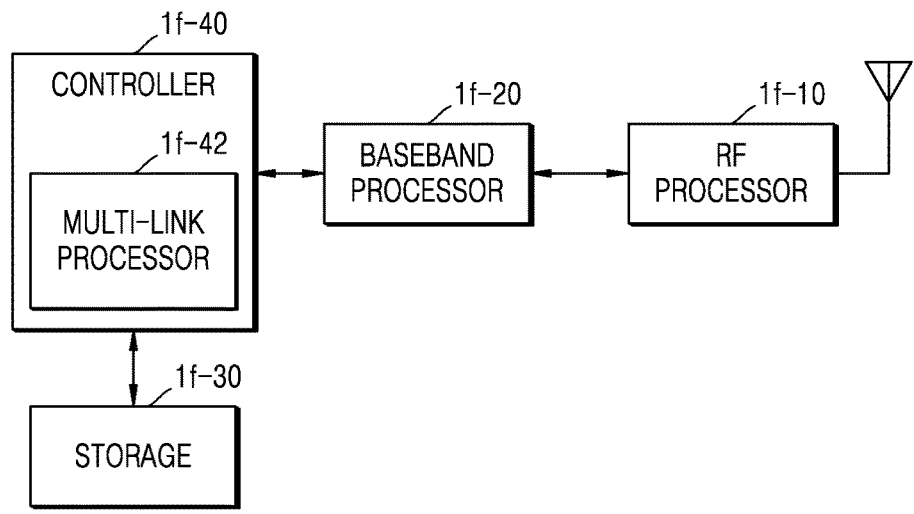
FIG. 6 is a block diagram illustrating an internal structure of a terminal, according to an embodiment.

FIG. 6 is a block diagram illustrating an internal structure of a terminal, according to an embodiment.

Referring to FIG. 6, the terminal may include a radio frequency (RF) processor 1f-10, a baseband processor 1f-20, a storage 1f-30, and a controller 1f-40.

The RF processor 1f-10 may perform functions for transmitting and receiving signals through radio channels, e.g., signal band conversion and amplification. That is, the RF processor 1f-10 may up-convert a baseband signal provided from the baseband processor 1f-20, to an RF band signal and transmit the RF band signal through an antenna, and downconvert an RF band signal received through an antenna, to a baseband signal. For example, the RF processor 1f-10 may include a transmit filter, a receive filter, an amplifier, a mixer, an oscillator, a digital-to-analog converter (DAC), and an analog-to-digital converter (ADC). Although only a single antenna is illustrated in FIG. 6, the terminal may include a plurality of antennas. The RF processor 1f-10 may include a plurality of RF chains. The RF processor 1f-10 may perform beamforming. For beamforming, the RF processor 1f-10 may adjust phases and amplitudes of signals transmitted or received through multiple antennas or antenna elements. The RF processor 1f-10 may perform multiple input multiple output (MIMO) and may receive data of multiple layers in the MIMO operation.

The baseband processor 1f-20 may convert between a baseband signal and a bitstream based on physical layer specifications of a system. For example, for data transmission, the baseband processor 1f-20 may generate complex symbols by encoding and modulating a transmit bitstream. For data reception, the baseband processor 1f-20 may reconstruct a received bitstream by demodulating and decoding a baseband signal provided from the RF processor 1f-10. For example, according to an OFDM scheme, for data transmission, the baseband processor 1f-20 may generate complex symbols by encoding and modulating a transmit bitstream, map the complex symbols to subcarriers, and then configure OFDM symbols by performing inverse fast Fourier transform (IFFT) and cyclic prefix (CP) insertion. For data reception, the baseband processor 1f-20 may split a baseband signal provided from the RF processor 1f-10, in OFDM symbol units, reconstruct signals mapped to subcarriers by performing fast Fourier transform (FFT), and then reconstruct a received bitstream by demodulating and decoding the signals.

The baseband processor 1f-20 and the RF processor 1f-10 may transmit and receive signals as described above. As such, each of the baseband processor 1f-20 and the RF processor 1f-10 may also be called a transmitter, a receiver, a transceiver, or a communicator. At least one of the baseband processor 1f-20 or the RF processor 1f-10 may include a plurality of communication modules to support multiple different radio access technologies. Also, at least one of the baseband processor 1f-20 or the RF processor 1f-10 may include different communication modules to process signals of different frequency bands. For example, the different radio access technologies may include wireless LAN (For example, IEEE 802.11), a cellular network (for example, LTE), and the like. The different frequency bands may include a super high frequency (SHF) (e.g., 2.N RHz and NRHz) band and an mmWave (e.g., 60 GHz) band. The terminal may transmit/receive a signal to/and from a base station by using the baseband processor 1f-20 and RF processor 1f-10. Here, the signal may include control information and data.

The storage 1f-30 may store data for operation of the base station described above, e.g., basic programs, application programs, and configuration information. In particular, the storage 1f-30 may store information related to a second access node performing wireless communication by using a second wireless access technology. The storage 1f-30 may provide the stored data upon request by the controller 1f-40. The storage 1f-30 may be configured in a storage medium, such as read-only memory (ROM), random access memory (RAM), a hard disk, CD-ROM, or DVD, or a combination thereof. Also, the storage 1f-30 may be configured in a plurality of memories. According to an embodiment, the storage 1f-30 may store a program for supporting beam-based cooperative communication.

The controller 1f-40 may control overall operations of the terminal. For example, the controller 1f-40 may transmit and receive signals through the baseband processor 1f-20 and the RF processor 1f-10. The controller 1f-40 may record and read data on and from the storage 1f-30. In this regard, the controller 1f-40 may include at least one processor. For example, the controller 1f-40 may include a communication processor (CP) for controlling communications and an application processor (AP) for controlling an upper layer such as an application program. According to the embodiment of the present disclosure, the controller 1f-40 includes a multi-link processor 1f-42 that performs the processing to be operated in a multi-link mode.

Figure 7:
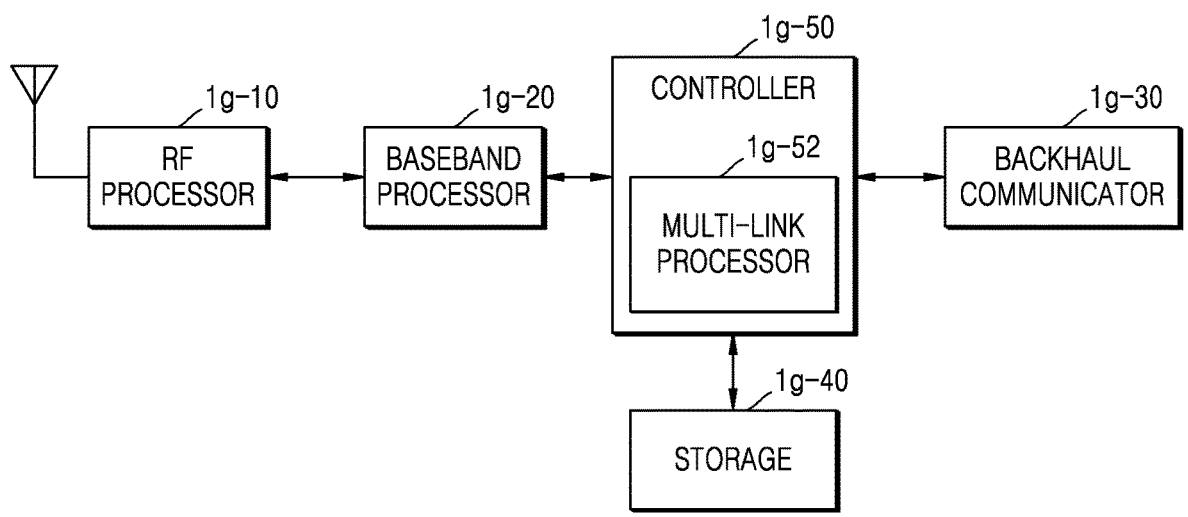
FIG. 7 is a block diagram illustrating a configuration of a base station, according to an embodiment.

FIG. 7 is a block diagram illustrating a configuration of a main base station in a wireless communication system, according to an embodiment.

As shown in FIG. 7, the base station may include an RF processor 1g-10, a baseband processor 1g-20, a backhaul communicator 1g-30, a storage 1g-40, and a controller 1g-50.

The RF processor 1g-10 may perform functions for transmitting and receiving signals through radio channels, e.g., signal band conversion and amplification. That is, the RF processor 1g-10 up-converts a baseband signal provided from the baseband processor 1g-20, to an RF band signal and transmit the RF band signal through an antenna, and down-converts an RF band signal received through an antenna, to a baseband signal. For example, the RF processor 1g-10 may include a transmit filter, a receive filter, an amplifier, a mixer, an oscillator, a DAC, and an ADC. Although only a single antenna is illustrated in FIG. 7, the base station may include a plurality of antennas. The RF processor 1g-10 may include a plurality of RF chains. In addition, the RF processor 1g-10 may perform beamforming. For beamforming, the RF processor 1g-10 may adjust phases and amplitudes of signals transmitted or received through a plurality of antennas or antenna elements. The RF processor 1g-10 may perform a downlink MIMO operation by transmitting at least one layer.

The baseband processor 1g-20 may convert between a baseband signal and a bitstream based on physical layer specifications of a first radio access technology. For example, for data transmission, the baseband processor 1g-20 may generate complex symbols by encoding and modulating a transmit bitstream. For data reception, the baseband processor 1g-20 may reconstruct a received bitstream by demodulating and decoding a baseband signal provided from the RF processor 1g-10. For example, according to an OFDM scheme, for data transmission, the baseband processor 1g-20 generates complex symbols by encoding and modulating a transmit bitstream, maps the complex symbols to subcarriers, and then configures OFDM symbols by performing IFFT and CP insertion. For data reception, the baseband processor 1g-20 may split a baseband signal provided from the RF processor 1g-10, in OFDM symbol units, reconstruct signals mapped to subcarriers by performing FFT, and then reconstruct a received bitstream by demodulating and decoding the signals. The baseband processor 1g-20 and the RF processor 1g-10 may transmit and receive signals as described above. As such, each of the baseband processor 1g-20 and the RF processor 1g-10 may also be called a transmitter, a receiver, a transceiver, a communicator, or a wireless communicator.

The backhaul communicator 1g-30 may provide an interface for communicating with other nodes in a network. In other words, the backhaul communicator 1g-30 may convert a bit string transmitted from a main base station to another node, for example, an auxiliary base station or a core network, into a physical signal, and convert a physical signal received from the other node into a bit string.

The storage 1g-40 may store data for operation of the main base station described above, e.g., basic programs, application programs, and configuration information. In particular, the storage 1g-40 may store information about bearers allocated to a connected terminal, a measurement report transmitted from the connected terminal, etc. The storage 1g-40 may store criteria information used to determine whether to provide or release multi-connectivity (or multi-link) to (or from) the terminal. The storage 1g-40 may provide the stored data upon request by the controller 1g-50.

The controller 1g-50 may control overall operations of the main base station. For example, the controller 1g-50 may transmit and receive signals through the baseband processor 1g-20 and the RF processor 1g-10 or through the backhaul communicator 1g-30. The controller 1g-50 may record and read data on and from the storage 1g-40. In this regard, the controller 1g-50 may include at least one processor. According to the embodiment of the present disclosure, the controller 1g-50 includes a multi-link processor 1g-52 that performs the processing to be operated in a multi-link mode.

Figure 8:
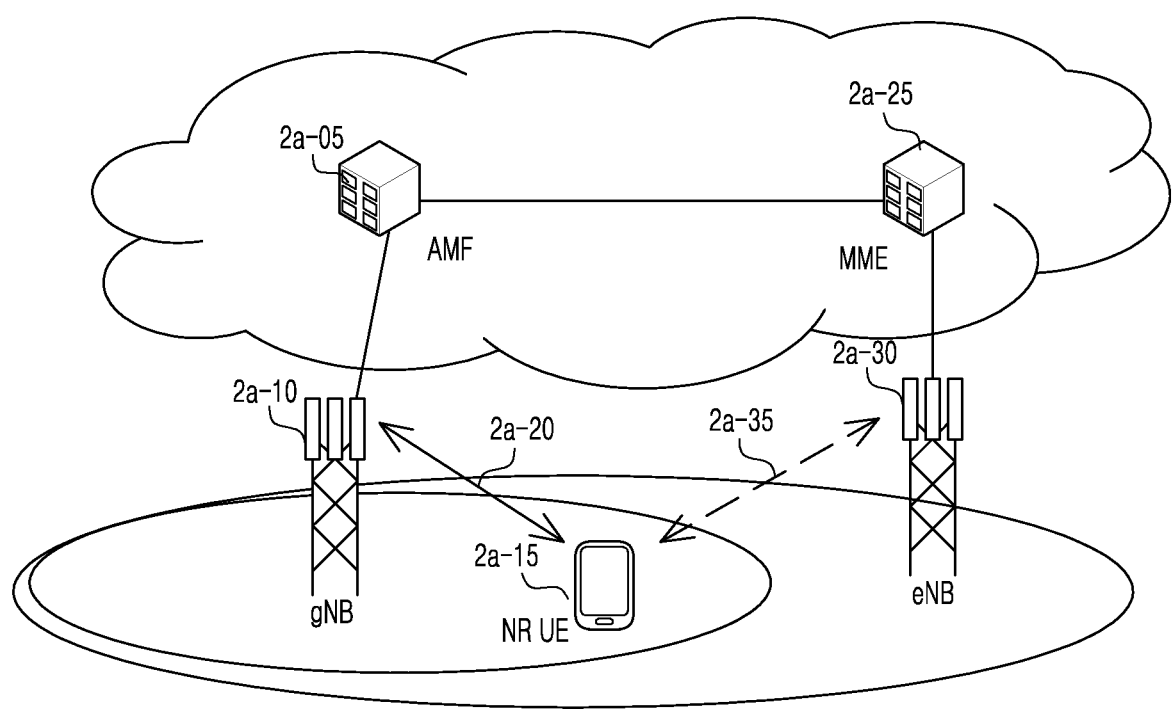
FIG. 8 is a diagram of a structure of a next-generation mobile communication system to which an embodiment is applied.

FIG. 8 is a diagram of a structure of a next-generation mobile communication system to which an embodiment is applied. Referring to FIG. 8, a radio access network (RAN) of the next-generation mobile communication system (e.g., a new radio (NR) or 5G) may include an NR node B (NR NB) (hereinafter, referred to as a gNB) 2a-10 and an access and mobility management function (AMF) 2a-05 (a new radio core network). A new radio user equipment (NR UE) or terminal 2a-15 may access an external network via the gNB 2a-10 and the AMF 2a-05.

In FIG. 8, the gNB 2a-10 may correspond to an evolved node B (eNB) of an LTE system. The gNB 2a-10 is connected to the NR UE 2a-15 through radio channels and may provide superior services compared to an existing NB, i.e., eNB 2a-20. Because all user traffic data is serviced through shared channels in the next-generation mobile communication system, an entity for collating buffer status information of UEs, available transmission power status information, channel status information, etc. and performing scheduling is required and such operations may be performed by the gNB 2a-10. A single gNB may generally control multiple cells. An existing maximum bandwidth or more may be provided to implement high-speed data transmission, compared to LTE, and a beamforming technology may be additionally applied by using OFDM as a radio access technology. Also, adaptive modulation and coding (AMC) may be used to determine a modulation scheme and a channel coding rate in accordance with a channel status of the NR UE 2a-15. The AMF 2a-05 may perform functions such as mobility support, bearer configuration, and quality of service (QoS) configuration. The AMF 2a-05 is an entity for performing a mobility management function and various control functions for the NR UE 2a-15 and may be connected to multiple gNBs 2a-10. The next generation mobile communication system may cooperate with the existing LTE system, and the AMF 2a-05 may be connected to a mobility management entity (MME) 2a-25 through a network interface. The MME 2a-25 may be connected to an eNB 2a-30 that is an existing base station. The NR UE 2a-15 supporting LTE-NR dual connectivity may transmit and receive data while maintaining a connection 2a-35 to the eNB 2a-30, in addition with the gNB 2a-10.

Figure 9:
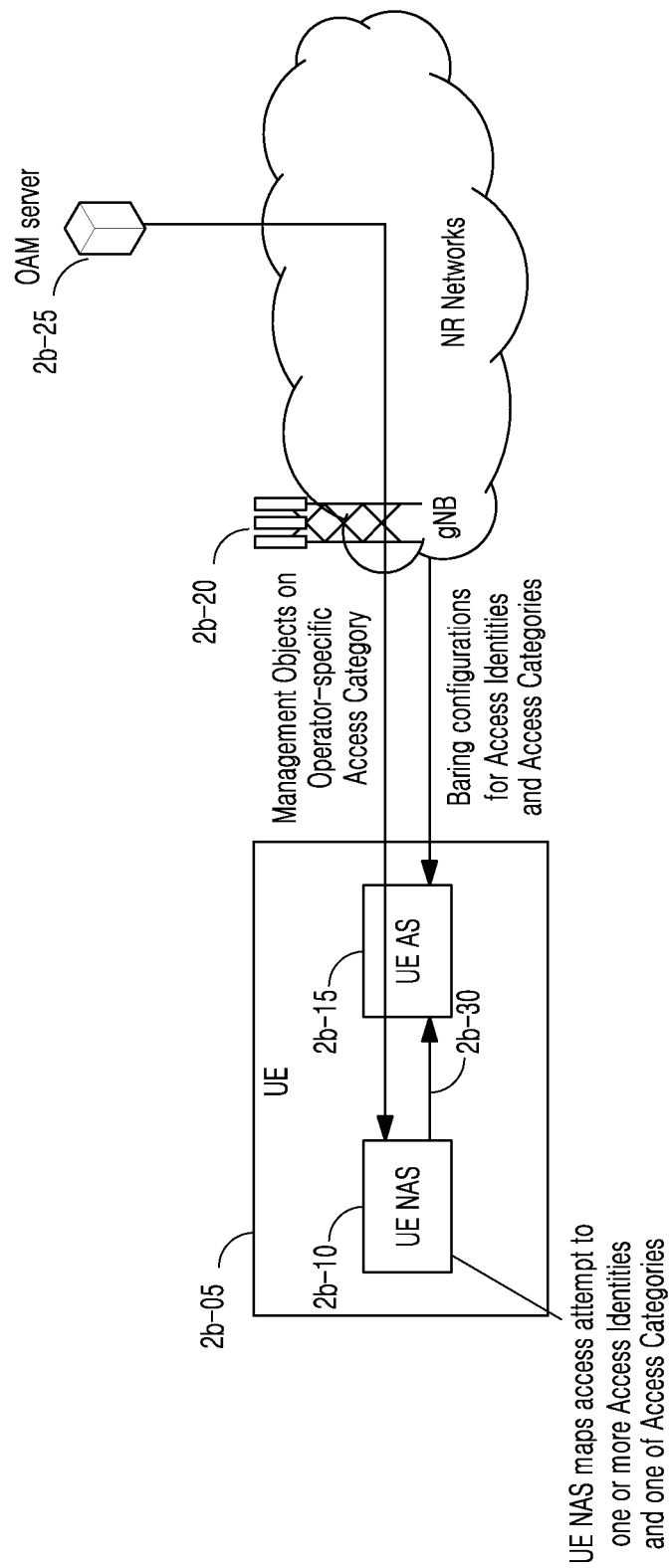
FIG. 9 is a diagram for describing a process of performing an access control by a terminal in a connected mode or inactive mode, according to an embodiment.

FIG. 9 is a diagram for describing a process of performing an access control by a terminal in a connected mode or inactive mode, according to an embodiment.

In the embodiment described with reference to FIG. 9, a method of effectively providing access control configuration information based on an access identity and access category is proposed. The access identity is indication information defined in the 3GPP, i.e., specified in the standard document. The access identity is used to indicate a specific access as in Table 4 below. The access identity may mainly indicate accesses classified from access classes 11 to 15, an MPS, and an MCS. The access class 11 to 15 may indicate accesses exclusive for business personnel or for public purposes.

TABLE 4

| Access Identity number | UE configuration |
| --- | --- |
| 0 | UE is not configured with any parameters from this table |
| 1 (NOTE 1) | UE is configured for Multimedia Priority Service (MPS). |
| 2 (NOTE 2) | UE is configured for Mission Critical Service (MCS). |
| 3-10 | Reserved for future use |
| 11 (NOTE 3) | Access Class 11 is configured in the UE. |
| 12 (NOTE 3) | Access Class 12 is configured in the UE. |
| 13 (NOTE 3) | Access Class 13 is configured in the UE. |
| 14 (NOTE 3) | Access Class 14 is configured in the UE. |
| 15 (NOTE 3) | Access Class 15 is configured in the UE. |

NOTE 1:
Access Identity 1 is used to provide overrides according to the subscription information in UEs configured for MPS. The subscription information defines whether an override applies to UEs within one of the following categories:
a) UEs that are configured for MPS;
b) UEs that are configured for MPS and are in the PLMN listed as most preferred PLMN of the country where the UE is roaming in the operator-defined PLMN selector list or in their HPLMN or in a PLMN that is equivalent to their HPLMN;
c) UEs that are configured for MPS and are in their HPLMN or in a PLMN that is equivalent to it.
NOTE 2:
Access Identity 2 is used to provide overrides according to the subscription information in UEs configured for MCS. The subscription information defines whether an override applies to UEs within one of the following categories:
a) UEs that are configured for MCS;
b) UEs that are configured for MCS and are in the PLMN listed as most preferred PLMN of the country where the UE is roaming in the operator-defined PLMN selector list or in their HPLMN or in a PLMN that is equivalent to their HPLMN;
c) UEs that are configured for MCS and are in their HPLMN or in a PLMN that is equivalent to it.
NOTE 3:
Access Identities 11 and 15 are valid in Home PLMN only if the EHPLMN list is not present or in any EHPLMN. Access identities 12, 13 and 14 are valid in Home PLMN and visited PLMNs of home country only. For this purpose the home country is defined as the country of the MCC part of the IMSI.

The access category may be classified into two types. One type may be a standardized access category. The category is a category defined in an RAN level, i.e., specified in the standard document. Accordingly, different business operators (e.g. network operator) may apply the same standardized access category. In the present disclosure, a category corresponding to emergency may belong to the standardized access category. All accesses may correspond to at least one of the standardized access categories.

Another type is an operator-specific (non-standardized) access category. The above category is defined outside 3GPP, and is not specified in the standard document. Accordingly, what is meant by one operator-specific access category may differ for each business operator. Characteristics thereof may be the same as a category in existing ACDC. An access triggered in a terminal NAS may not be mapped to the operator-specific access category. A big difference from the existing ACDC is that the category not only corresponds to an application, but may also correspond to components other than the application, such as a service type, a call type, a terminal type, a user group, a signaling type, a slice type, or a combination thereof. In other words, whether to approve an access for accesses belonging to the other components may be controlled. The access category may be used to indicate a specific access as in Table 5 below. Access categories 0 through 7 may be used to indicate the standardized access category and access categories 32 through 63 may be used to indicate the operator-specific access category.

TABLE 5

| Access Category number | Conditions related to UE | Type of access attempt |
| --- | --- | --- |
| 0 | All | MO signalling resulting from paging |
| 1 (NOTE 1) | UE is configured for delay tolerant service and subject to access control for Access Category 1, which is judged based on relation of UE's HPLMN and the selected PLMN. | All except for Emergency |
| 2 | All | Emergency |
| 3 | All except for the conditions in Access Category 1. | MO signalling resulting from other than paging |
| 4 | All except for the conditions in Access Category 1. | MMTEL voice |
| 5 | All except for the conditions in Access Category 1. | MMTEL video |
| 6 | All except for the conditions in Access Category 1. | SMS |
| 7 | All except for the conditions in Access Category 1. | MO data that do not belong to any other Access Categories |
| 8-31 | | Reserved standardized Access Categories |
| 32-63 (NOTE 2) | All | Based on operator classification |

NOTE 1:
The barring parameter for Access Category 1 is accompanied with information that define whether Access Category applies to UEs within one of the following categories:
a) UEs that are configured for delay tolerant service;
b) UEs that are configured for delay tolerant service and are neither in their HPLMN nor in a PLMN that is equivalent to it;
c) UEs that are configured for delay tolerant service and are neither in the PLMN listed as most preferred PLMN of the country where the UE is roaming in the operator-defined PLMN select or list on the SIM/USIM, nor in their HPLMN nor in a PLMN that is equivalent to their HPLMN.
NOTE 2:
When there are an Access Category based on operator classification and a standardized Access Category to both of which an access attempt can be categorized, and the standardized Access Category is neither 0 nor 2, the UE applies the Access Category based on operator classification. When there are an Access Category based on operator classification and a standardized Access Category to both of which an access attempt can be categorized, and the standardized Access Category is 0 or 2, the UE applies the standardized Access Category.

A business operator server 2b-25 may provide information (MO) about the operator-specific access category to a terminal NAS 2b-10 via NAS signaling or application level data transmission. The information may indicate to which element, such as an application, each operator-specific access category corresponds. For example, the access category 32 may specify, in the information, correspondence to an access corresponding to a Facebook application. A base station 2b-20 may use system information to provide, to terminals 2b-05, a category list providing the barring configuration information, and the barring configuration information corresponding to each category. The terminals 2b-05 may include logical blocks of NAS 2b-10 and AS 2b-15.

The terminal NAS 2b-10 may map a triggered access to the one or more access identity and one access category, according to a predetermined rule. Such a mapping operation may be performed in all RRC states, i.e., a connected mode (RRC_CONNECTED), an idle mode (RRC_IDLE), and an inactive mode (RRC_INACTIVE). Characteristics of each RRC state may be as follows.

RRC_IDLE:
A UE specific DRX may be configured by upper layers;
UE controlled mobility based on network configuration;
The UE:
Monitors a paging channel;
Performs neighboring cell measurements and cell (re-) selection;
Acquires system information.
RRC_INACTIVE:
A UE specific DRX may be configured by upper layers or by RRC layer;
UE controlled mobility based on network configuration;
The UE stores the AS context;
The UE:
Monitors a paging channel;
Performs neighboring cell measurements and cell (re-) selection;
Performs RAN-based notification area updates when moving outside the RAN-based notification area;
Acquires system information.
RRC_CONNECTED:
The UE stores the AS context.
Transfer of unicast data to/from UE.
At lower layers, the UE may be configured with a UE specific DRX;
For UEs supporting CA, use of one or more SCells, aggregated with the SpCell, for increased bandwidth;
For UEs supporting DC, use of one SCG, aggregated with the MCG, for increased bandwidth;
Network controlled mobility, i.e., handover within NR and to/from E-UTRAN.
The UE:
Monitors a paging channel;
Monitors control channels associated with the shared data channel to determine if data is scheduled for it;
Provides channel quality and feedback information;
Performs neighboring cell measurements and measurement reporting;
Acquires system information.

As another option, when one access is mappable to one standardized access category, the access may be additionally mapped to one operator-specific access category, in the above access category mapping. The terminal NAS 2b-10 may transmit, to the terminal AS 2b-15, the mapped access identity and access category together with a service request.

Upon receiving information about the access identity or access category together with the message received from the terminal NAS 2b-10 in all RRC states, the terminal AS 2b-15 may perform a barring check operation of determining whether a wireless access is allowed before performing the wireless access caused by the message.

Through the barring check operation, when the wireless access is allowed, the terminal 2b-05 may request a network for RRC connection configuration. According to an embodiment, the terminal NAS 2b-10 in the connected mode or inactive mode may transmit, to the terminal AS 2b-15, the access identity and access category according to following reasons (2b-30). In the present disclosure, the reasons are collectively referred to as a 'new session request'.
New MMTEL voice or video session
Sending of SMS (SMS over IP, or SMS over NAS)
New PDU session establishment
Existing PDU session modification
Service request to re-establish the user plane for an existing PDU session On the other hand, during the service request, the terminal NAS 2b-10 in the idle mode may transmit the access identity and access category to the terminal AS 2b-15.

The terminal AS 2b-15 may determine whether the access triggered by the terminal NAS 2b-10 is allowed, by using the barring configuration information (barring check).

The business operator may desire to allow only a specific service type among accesses corresponding to at least one of access classes 11 through 15. Accordingly, an embodiment of the present disclosure may be characterized in determining whether an access belonging to access class 11, 12, 13, 14, or 15 indicated by the access identity is allowed according to attributes distinguished by the access category. In this regard, an embodiment proposes a method of configuring the barring configuration information of the access identity or access category. In the present disclosure, for example, it is assumed that the barring configuration information of the access category includes ac-barringFactor 와 ac-barringTime like barring configuration information of general access class barring (ACB) or ACDC.

Figure 10:
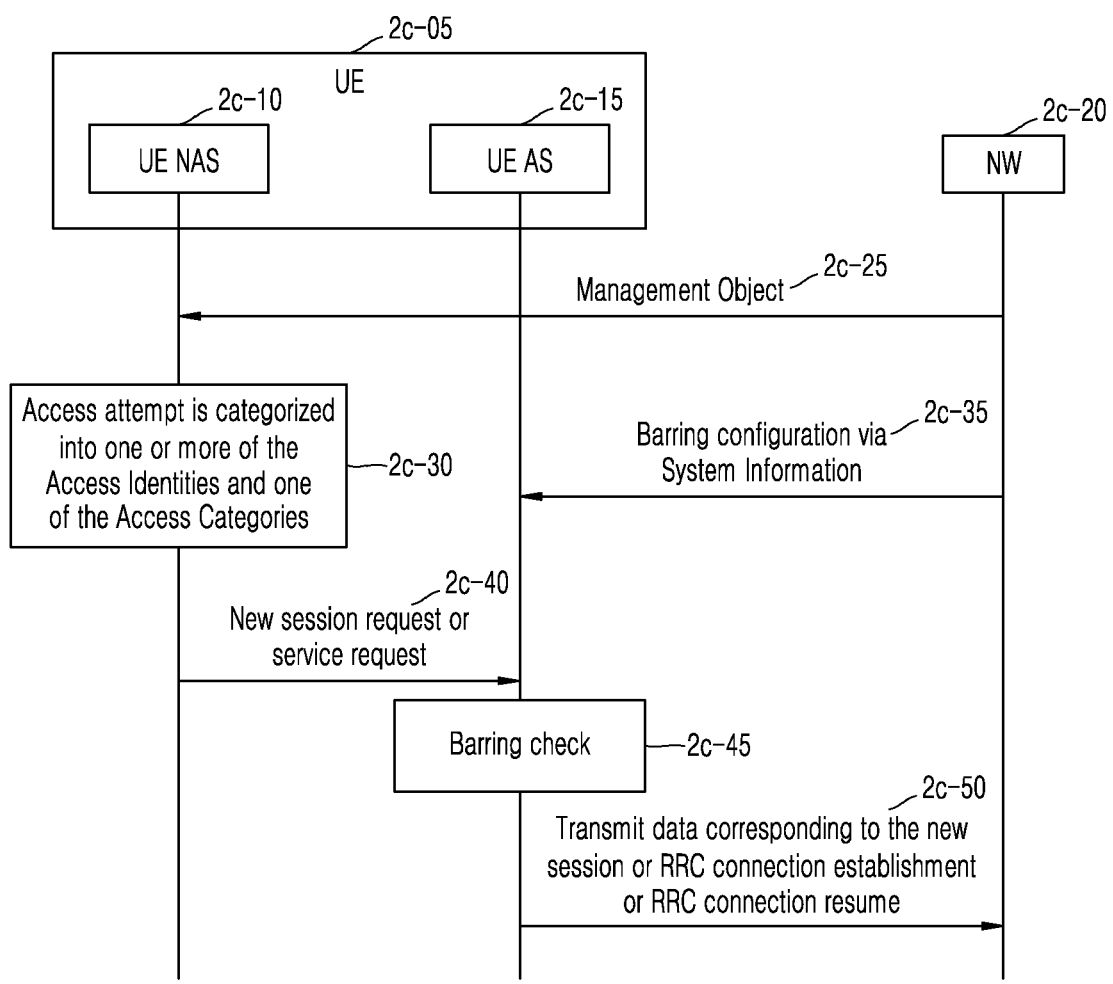
FIG. 10 is a flowchart for describing a process of performing an access control by a terminal in a connected mode or inactive mode, according to an embodiment.

FIG. 10 is a flowchart for describing a process of performing an access control by a terminal in a connected mode or inactive mode, according to an embodiment.

Referring to FIG. 10, a terminal 2c-05 includes an NAS 2c-10 and an AS 2c-15. The NAS 2c-10 may be in charge of processes not directly related to the wireless access, i.e., authentication, a service request, and session management, whereas the AS 2c-15 may be in charge of processes related to the wireless access.

In operation 2c-25, a network (NW) 2c-20 may provide MO information to the NAS 2c-10 by using OAM (a data message of an application level) or NAS message. The information may indicate to which element, such as an application, each operator-specific access category corresponds. The NAS 2c-10 may use the above information to determine to which operator-specific access category the triggered access is mapped. The triggered access may correspond to a new MMTel service (a voice call or video call), SMS transmission, new PDU session establishment, or existing PDU session change.

In operation 2c-30, when a service is triggered, the NAS 2c-10 may map an attribute of the service to a corresponding access identity and access category. The service may not be mapped to any access identity or may be mapped to one or more access identities. Also, the service may be mapped to one access category. Upon an assumption that the service may be mapped to one access category, it may be first identifies whether the service is mapped to the operator-specific access category provided in the MO. When the service is not mapped to any operator-specific access category, the service may be mapped to a corresponding one of the standardized access categories. Upon an assumption that the service may be mapped to a plurality of access categories, one service may be mapped to one operator-specific access category and one standardized access category. However, when the service is not mapped to any operator-specific access category, the service may be mapped to a corresponding one of the standardized access categories. According to an embodiment, in the above mapping rule, an emergency service may be an exception.

In operation 2c-40, the NAS 2c-10 transmits, to the AS 2c-15, a new session request or service request together with the mapped access identity and access category. The NAS 2c-10 may transmit the new session request in the connected mode or inactive mode, and may transmit the service request in the idle mode.

In operation 2c-35, the AS 2c-15 may receive barring configuration information from system information broadcasted by the network 2c-20. An example of an ASN.1 structure of the barring configuration information is as a code below, and detailed description thereof will be described below.

when not. When it is determined that the access is barred, the terminal AS 2c-15 may delay an access attempt during a certain period of time derived by using Equation 2 below. The terminal AS 2c-15 may start a timer having the above-described time value. In the present disclosure, the timer is referred to as a barring timer.

TABLE 6

```
UAC-BarringPerPLMN-List ::=     SEQUENCE (SIZE (1.. maxPLMN)) OF UAC-BarringPerLMN
UAC-BarringPerPLMN ::=          SEQUENCE {
        plmn-IdentityIndex                      INTEGER (1..maxPLMN),
        uac-ACBarringListType           CHOICE{
            uac-ImplicitACBarringList                   SEQUENCE (SIZE (maxAccessCat-1)) OF UAC-Barring
InfoSetIndex,
            uac-ExplicitACBarringList                          UAC-BarringPerCatList
        }
}
UAC-BarringPerCatlist ::= SEQUENCE (SIZE (1..maxAccessCat-1)) OF UAC-BarringPerCat
UAC-BarringPerCat ::= SEQUENCE {
        accessCategory                  INTEGER (1..maxAccessCat-1) ,
        uac-barringInfoSetIndex                        UAC-BarringInfoSetIndex
}
UAC-BarringInfoSetIndex ::=             INTEGER (1..maxBarringInfoSet)
UAC-BarringInfoSetList ::= SEQUENCE (SIZE (1..maxBarringInfoSet)) OF UAC-BarringInfoSet
UAC-BarringInfoSet ::= SEQUENCE {
    uac-BarringFactor           ENUMERATED {
                                    p00, p05, p10, p15, p20, p25, p30, p40,
                                    p30, p60, p70, 975, p80, p8S, p90, p95},
    uac-BarringTime             ENUMERATED (s4, s8, s16, s32, s64, s128, s256, s512),
    uac-BarringForAccessIdentity                BIT STRING (SIZE(7))
}
```

In operation 2c-45, the AS 2c-15 may determine whether the service request is allowed by using the corresponding barring configuration information received from the network 2c-20 and information about the access identity and access category mapped by the NAS 2c-10. In the present disclosure an operation of determining whether the service request is allowed may be referred to as barring check. The terminal 2c-05 may receive the system information including access control configuration information and store the access control configuration information. The barring configuration information may be provided for each PLMN and for each access category. A BarringPerCatList IE may be used to provide the barring configuration information of access categories belonging to one PLMN. In this regard, a PLMN ID and the barring configuration information of each access category may be included in the above IE in a form of a list. The barring configuration information for each access category may include an access category ID (or index), a uac-BarringForAccessIdentity field, a uac-BarringFactor field, and a uac-Barringtime field indicating a specific access category.

An embodiment of the barring check operation will now be described in detail. First, each bit configuring the uac-BarringForAccessIdentity corresponds to one access identity, and when a bit value is indicated '0', an access related to the access identity is allowed. When at least one of corresponding bits in the uac-BarringForAccessIdentity is '0' for at least one of the mapped access identities, the access may be allowed. When none of the corresponding bits in the uac-BarringForAccessIdentity is not '0' for at least one of the mapped access identities, additional barring check described below may be performed by additionally using the uac-BarringFactor field. A range of the uac-BarringFactor α may be 0≤α<1. The terminal AS 2c-15 derives one random value rand, wherein 0≤rand<1, and may consider that the access is not barred when the random value is smaller than the uac-BarringFactor and consider that the access is barred $$\text{"}T\text{barring"}=(0.7+0.6*rand)*\text{uac-BarringTime.} \qquad [\text{Equation 2}]$$

When the access is barred, the terminal AS 2c-15 may notify the same to the terminal NAS 2c-10. Also, when the derived certain period of time expires, the terminal AS 2c-15 may notify the terminal NAS 2c-10 that the access may be requested again (barring alleviation). From this time, the terminal NAS 2c-10 may request the terminal AS 2c-15 for the access again.

In operation 2c-50, when the service request is allowed according to the predetermined rule, the AS 2c-15 may request the network 2c-20 for RRC connection establishment or RRC connection resume or may transmit data related to a new session.

In a next-generation mobile communication system, the terminal AS 2c-15 may trigger an access. According to an embodiment, the terminal (UE 2c-05) in the inactive mode may trigger a RAN Notification Area (RNA) update or resume process without participation of the terminal NAS 2c-10. The RNA update is an operation similar to Tracking Area Update (TAU), wherein the RNA is reported to a RAN periodically or when the terminal 2c-05 moves to a new area outside a region (RNA) of in pre-set cell or cell group units in an RAN level. The resume is a process of the terminal 2c-05 in the inactive mode switching to the connected mode to start data transmission/reception again. Generally, RRC message transmission/reception in 3 stages may be requested. In the present disclosure, for example, the access described above is referred to as an AS-triggered event.

Figure 11:
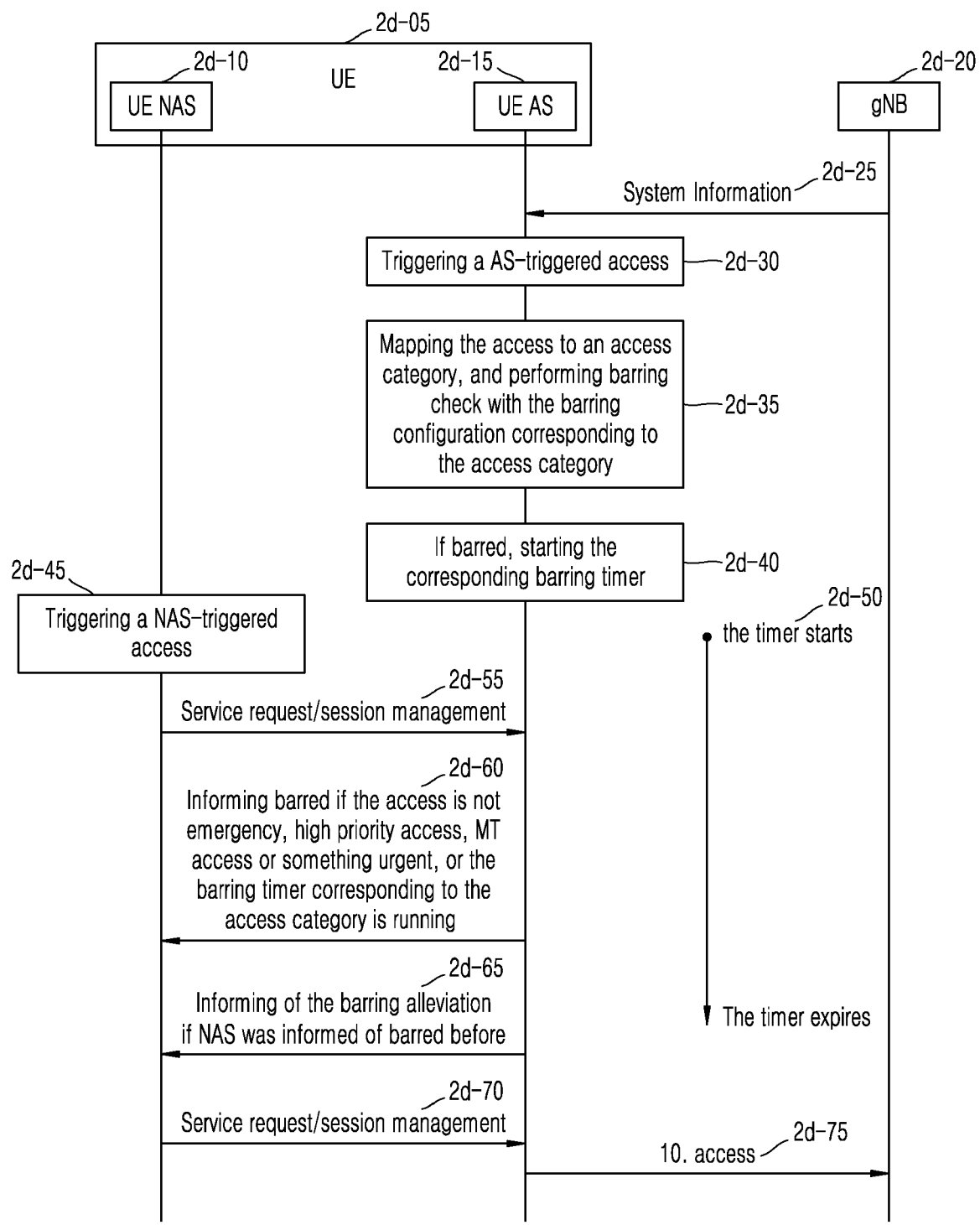
FIG. 11 is a flowchart for describing a process of performing an access control on an access stratum (AS)-triggered event by a terminal in a connected mode or inactive mode, according to an embodiment.

FIG. 11 is a flowchart for describing a process of performing an access control on an AS-triggered event by a terminal in a connected mode or inactive mode, according to an embodiment.

Referring to FIG. 11, a terminal 2d-05 includes a terminal NAS 2d-10 and a terminal AS 2c-15. In a general LTE system, the terminal NAS 2d-10 triggers an access, but in a next-generation mobile communication system, the terminal AS 2c-15 may trigger a specific access.

In operation 2d-25, a base station (gNB) 2d-20 may use system information to provide barring configuration information to terminals in a service area. The barring configuration information may be provided for each access category.

In operation 2d-30, the terminal AS 2c-15 may trigger the specific access, such as RNA update or resume.

In operation 2d-35, the terminal AS 2c-15 may map the access to one corresponding access category. Also, the terminal AS 2c-15 may perform barring check by using the barring configuration information corresponding to the mapped access category. The barring check has been described above with reference to drawings. Based on a result of the barring check, in operation 2d-40, when it is considered that the access is barred, the terminal AS 2c-15 may derive one barring time and start a timer having the time value, i.e., a barring timer. While the timer is running, it may be considered that the access corresponding to the access category is barred. Accordingly, the terminal AS 2c-15 may not trigger the AS-triggered event where the access is barred until the timer expires. When the terminal NAS 2d-10 does not trigger an NAS-triggered event where the access is barred before the timer expires or even when the NAS-triggered event is triggered, the terminal AS 2d-15 may consider that the NAS-triggered event is barred from being accessed. According to an embodiment, several following options may be proposed in relation to what extent of the access category the timer is to be applied.

Option 1: Apply single barring timer for all access categories.

One timer may start when it is considered that an access corresponding to one access category is barred via barring check. While the timer is running, it is unable to attempt access to all access categories. Here, an access attempt may be allowed for a pre-set or defined specific access category. For example, an emergency call, high priority access, or mobile termination (MT) access may be attempted regardless of whether the timer is running.

Option 2: Apply barring timer for each access category.

One timer may start when it is considered that an access corresponding to one access category is barred via barring check. While the timer is running, it may be unable to attempt access to the corresponding access category. Accordingly, access to other access categories may be attempted.

Option 3: Apply barring timer for each predetermined access category group.

One timer may start when it is considered that an access corresponding to one access category is barred via barring check. While the timer is running, it may be unable to attempt access to all access categories of a group to which the corresponding access category belongs. The group may be specified in various definitions. According to an embodiment, the group may be formed by standardized access categories, the operator-specific access categories, certain priorities, an NAS-triggered event, or an AS-triggered event.

Option 4: Apply barring timer for each standardized access category and apply single barring timer for all operator-specific access category.

When it is considered that an access corresponding to one standardized access category is barred via barring check, one timer may start. While the timer is running, it may be unable to attempt access to the corresponding standardized access category.

Here, access to other access categories may be attempted. On the other hand, when it is considered that an access corresponding to one operator-specific access category is barred via barring check, one timer may start. While the timer is running, it may be unable to attempt access to all operator-specific access category.

According to an embodiment of the present disclosure, when the access to the AS-triggered event is barred and a certain condition is not satisfied, the terminal NAS 2d-10 is not notified, and when the corresponding barring timer expires, the same may not be notified.

In operation 2d-50, the timer may start.

In operation 2d-45, because the terminal AS 2c-15 does not notify the terminal NAS 2d-10 that the access to the specific access category or access category group is barred, while the timer is running, the terminal NAS 2d-10 may trigger a new access for the specific access category or access category group.

In operation 2d-55, the terminal NAS 2d-10 may transmit, to the terminal AS 2c-15, a service request or session management together with the access category and access category corresponding to the access.

In operation 2d-60, the terminal AS 2c-15 may notify the terminal NAS 2d-10 that the access is not allowed when a barring timer corresponding to the new access is already running. Exceptionally, when the gNB 2d-20 allowed an access by using the system information with respect to the access identity received from the terminal NAS 2d-10 together with the access category, the access may be allowed.

When the terminal NAS 2d-10 is notified that the barring timer expired and the access is barred, the terminal AS 2c-15 may notify the terminal NAS 2d-10 that the timer expired, in operation 2d-65. This is to prevent the terminal NAS 2d-10 from repeatedly triggering the access despite that the barring timer is running.

In operation 2d-70, the terminal NAS 2d-10 that is notified that the barring timer expired may trigger a new access for the access category or access category group.

In operation 2d-75, the terminal AS 2c-15 performs barring check for the access and attempt an access to the gNB 2d-20 when it is considered that the access is allowed. Thus, the certain condition in the present disclosure may be a case where the terminal NAS 2d-10 triggers the new access to the access category or access category group corresponding to the barring timer while the terminal AS 2c-15 is running the barring timer and requests the terminal AS 2c-15 for the access.

An access, access category, or access category group not corresponding to the running barring timer may perform a separate operation.

Figure 12:
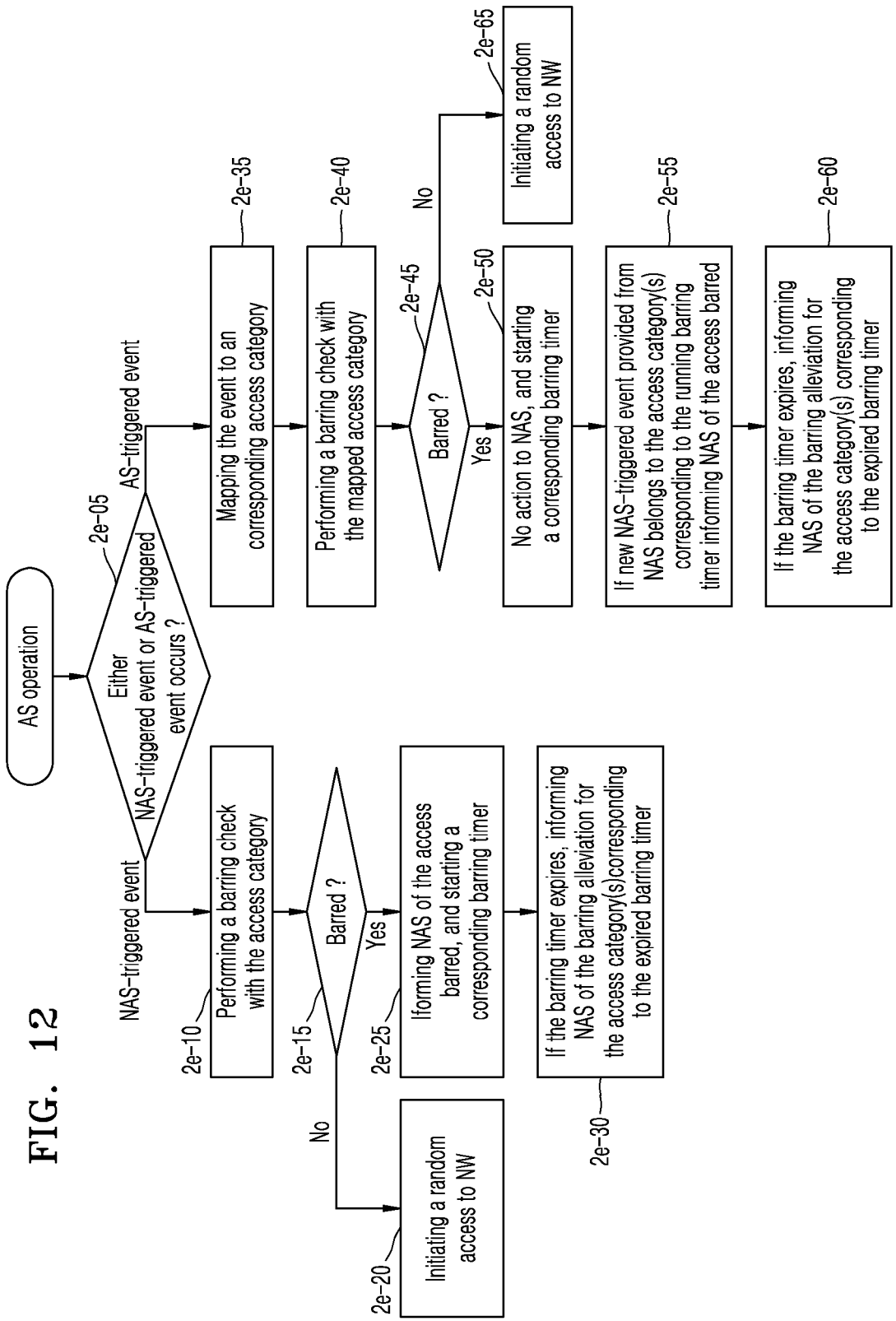
FIG. 12 is a flowchart for describing a terminal AS operation according to an embodiment.

FIG. 12 is a flowchart for describing a terminal AS operation according to an embodiment.

In operation 2e-05, the terminal AS may recognize an NAS-triggered event or AS-triggered event. The NAS-triggered event may be triggered by a terminal NAS and a related access category may be transmitted to the terminal AS. The AS-triggered event is triggered by the terminal AS and RNA update or resume may belong thereto.

In operation 2e-10, the terminal AS may perform barring check on the NAS-triggered event. Here, the terminal AS may use barring configuration information corresponding to an access category provided by the terminal NAS and an access category broadcasted by a base station. According to an embodiment, the terminal AS may provide one or more access identities together with the access category provided by the terminal NAS, and it may be considered that the access is allowed when the base station allowed an access for at least one of the access identities by using system information.

In operation 2e-15, the terminal AS may determine whether the access is barred via the barring check.

In operation 2e-20, when the access is allowed, the terminal AS may perform random access on the base station.

In operation 2e-25, when the access is not allowed, the terminal AS may notify the same to the terminal NAS and start one timer corresponding to the access category.

In operation 2e-30, when the running timer expires, the terminal AS notifies the terminal NAS that the access may be requested again (barring alleviation). From this time, the terminal NAS may request the access from the terminal AS again.

In operation 2e-35, the terminal AS may map one corresponding access category for the AS-triggered event. Also, one or more access identities may be mapped.

In operation 2e-40, the terminal AS may perform barring check. Here, the terminal AS may use barring configuration information corresponding to the mapped access category and an access category broadcasted by the base station. The terminal AS may consider that the access is allowed when the terminal NAS is able to map one or more access identities and the base station allowed an access for at least one of the access identities by using the system information.

In operation 2e-45, the terminal AS may determine whether the access is barred via the barring check.

In operation 2e-50, when the access is not allowed, the terminal AS may not notify the same to the terminal NAS and may start one timer corresponding to the access category.

In operation 2e-55, when the terminal NAS requests the terminal AS for the access belonging to the access category or access category group corresponding to the timer while the timer is running, the terminal AS may notify the terminal NAS that the access is barred.

In operation 2e-60, when the terminal NAS is notified that the access is barred while the timer is running, the terminal AS may notify the terminal NAS that the timer expired.

In operation 2e-65, when the access is allowed, the terminal AS may perform random access on the base station.

Figure 13:
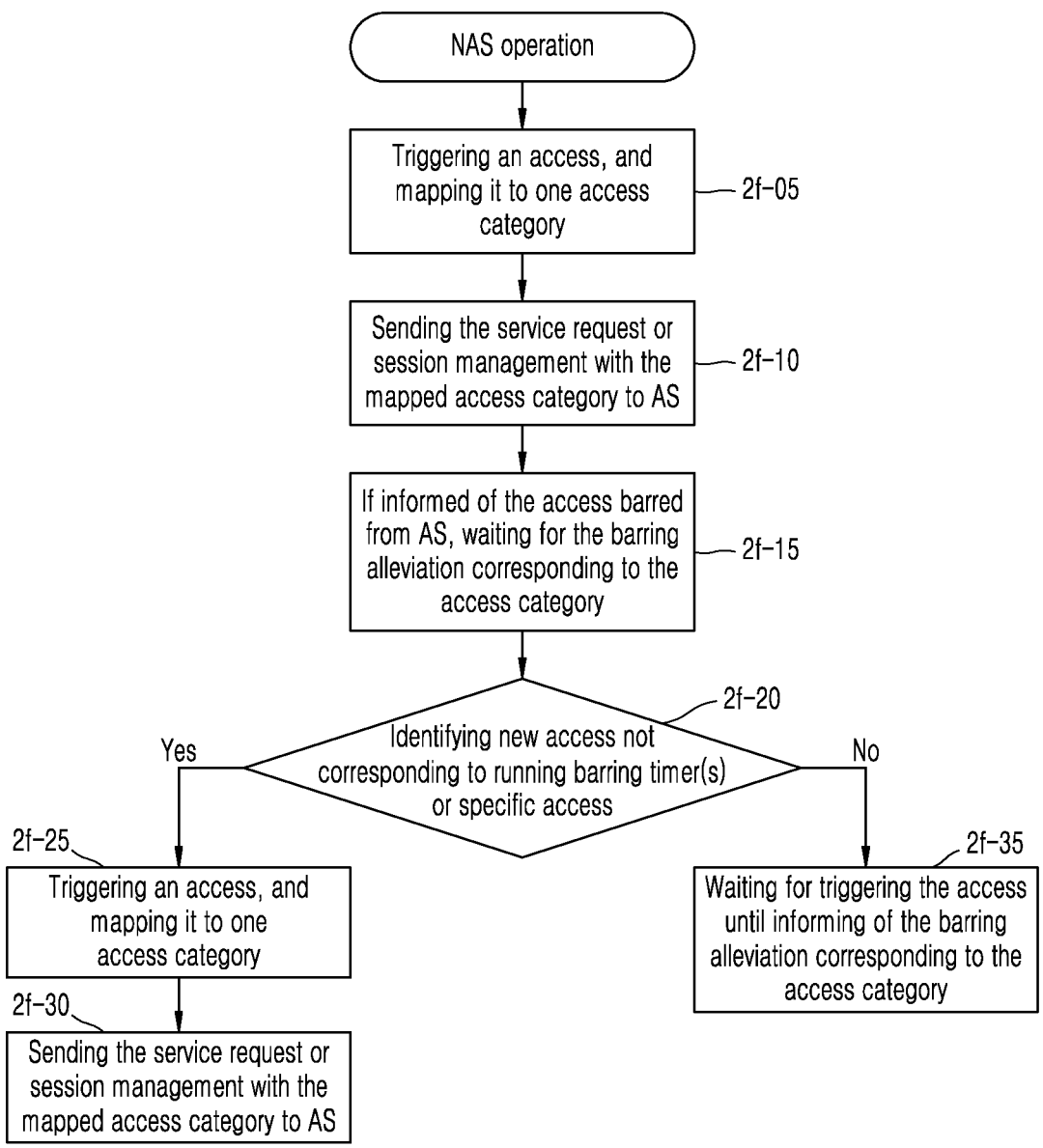
FIG. 13 is a diagram for describing a terminal non-access stratum (NAS) operation according to an embodiment.

FIG. 13 is a diagram for describing a terminal NAS operation according to an embodiment.

In operation 2f-05, the terminal NAS may trigger one access, map one corresponding access category thereto, and map one or more access identities thereto.

In operation 2f-10, the terminal NAS may transmit the mapped access category and access identity to a terminal AS.

In operation 2f-25, the terminal NAS may be notified by the terminal AS that the access is not allowed. Here, the terminal NAS may not trigger the access again until the terminal AS notifies that a corresponding timer expired and the access may be transmitted again. However, an access corresponding to an access category other than the above access category may be triggered.

In operation 2f-20, the terminal NAS may determine whether an access not corresponding to the running barring timer or a specific access, such as emergency or high priority access, is triggered.

In operation 2f-25, when the access not corresponding to the running barring timer or the specific access, such as emergency or high priority access, is triggered, the terminal NAS may map the access to one access category.

In operation 2f-30, the terminal NAS may transmit the access category to the terminal AS.

In operation 2f-35, when the access not corresponding to the running barring timer or the specific access, such as emergency or high priority access, is not triggered, the terminal NAS may standby until the terminal AS notifies that the access may be requested again (barring alleviation).

Figure 14:
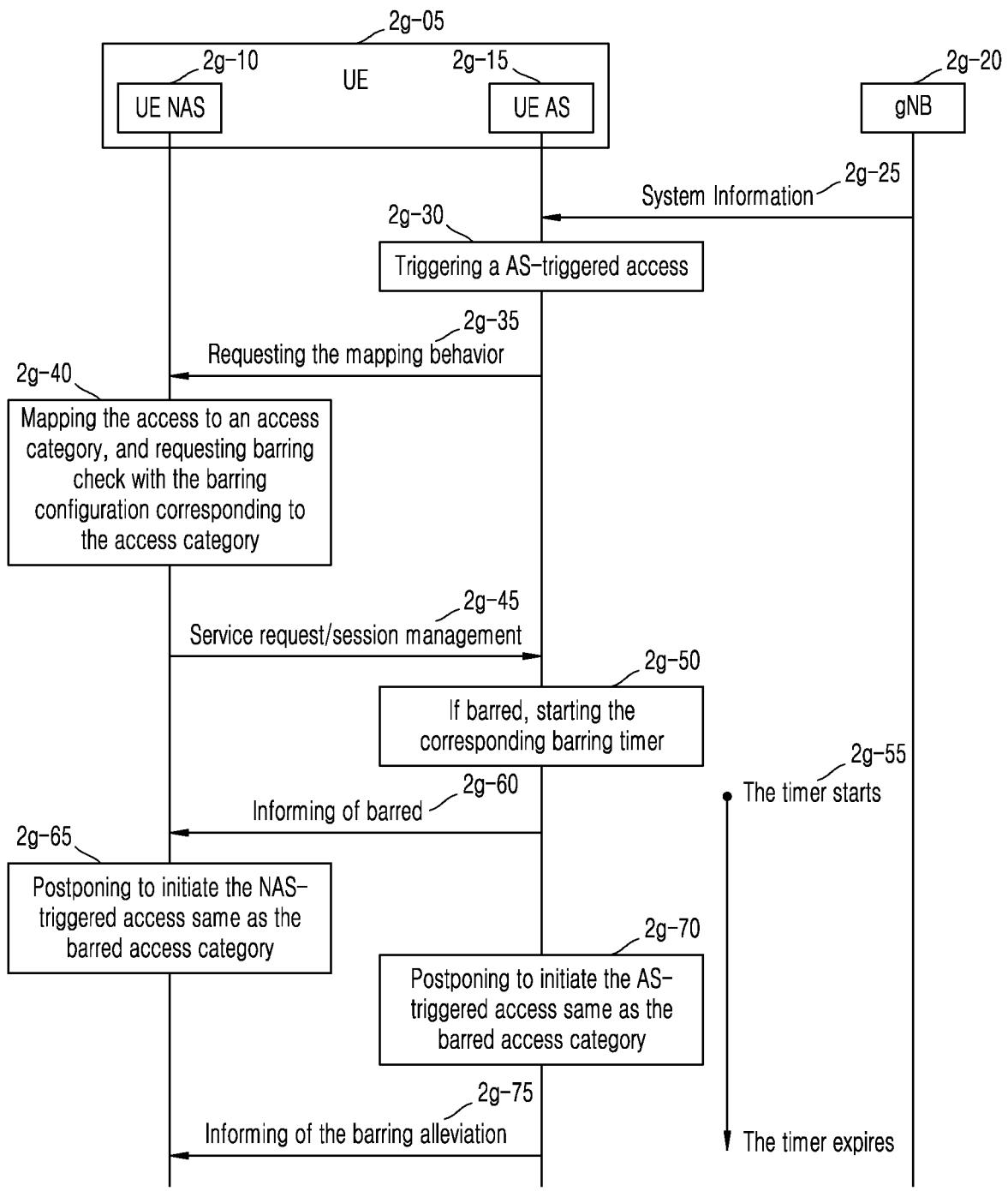
FIG. 14 is a flowchart for describing a process of performing an access control when NAS performs access category mapping on an AS-triggered event, according to an embodiment.

FIG. 14 is a flowchart for describing a process of performing an access control when NAS performs access category mapping on an AS-triggered event, according to an embodiment.

Referring to FIG. 14, in operation 2g-25, a base station (gNB) 2g-20 may use system information to provide barring configuration information to terminals in a service area. The barring configuration information may be provided for each access category.

In operation 2g-30, a terminal AS 2g-15 may trigger a specific access, such as RNA update or resume for data transmission.

In operation 2g-35, the terminal AS 2g-15 may request a terminal NAS 2g-10 for access category mapping with respect to the triggered access.

In operation 2g-40, the terminal NAS 2g-10 may map the access to one corresponding access category and access identity.

Then, in operation 2g-45, the terminal NAS 2g-10 may transmit, to the terminal AS 2g-15, information about the mapped access category and access identity. Here, the terminal NAS 2g-10 may include an indicator indicating that the transmitted access category and access identity are the access according to the request of the terminal AS 2g-15.

In operation 2g-50, the terminal AS 2g-15 may perform barring check by using barring configuration information corresponding to the mapped access category. The barring check has been described above with reference to drawings.

Based on a result of the barring check, in operation 2g-55, when it is considered that the access is barred, one barring time may be derived and a timer having the time value, i.e., a barring timer, may be started. While the timer is running, it is considered that the access corresponding to the access category is barred.

In operation 2g-60, the terminal AS 2g-15 does not trigger an AS-triggered event corresponding to the timer until the timer expires, and indicate the terminal NAS 2g-10 that the access to the access category corresponding to the timer is barred.

In operations 2g-65 and 2g-70, the terminal NAS 2g-10 and terminal AS 2g-15 may not trigger the barred access until the timer expires.

In operation 2g-75, when the barring timer expires, the terminal AS 2g-15 may notify the terminal NAS 2g-10 that the timer expired. An access, access category, or access category group not corresponding to the running barring timer may perform a separate operation.

Figure 15:
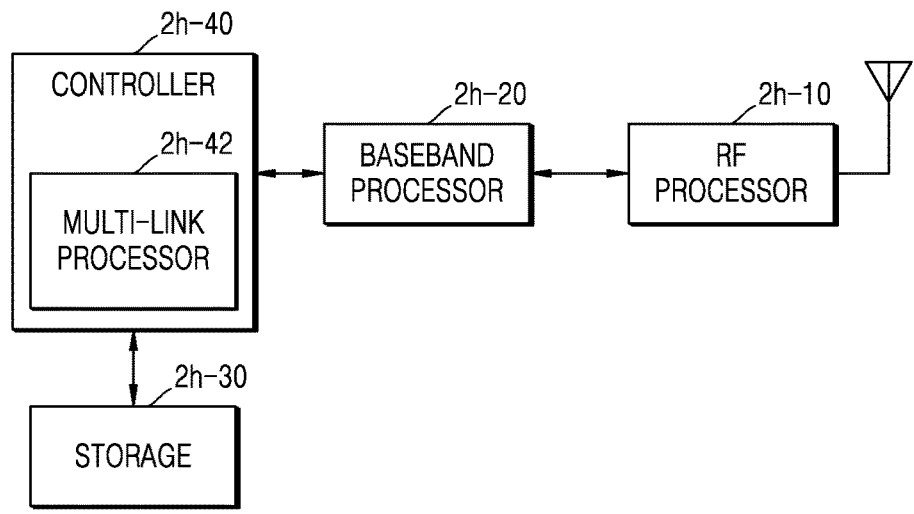
FIG. 15 is a block diagram illustrating an internal structure of a terminal, according to an embodiment.

FIG. 15 is a block diagram illustrating an internal structure of a terminal, according to an embodiment.

Referring to FIG. 15, the terminal may include an RF processor 2h-10, a baseband processor 2h-20, a storage 2h-30, and a controller 2h-40.

The RF processor 2h-10 may perform functions for transmitting and receiving signals through radio channels, e.g., signal band conversion and amplification. That is, the RF processor 2h-10 may up-convert a baseband signal provided from the baseband processor 2h-20, to an RF band signal and transmit the RF band signal through an antenna, and down-convert an RF band signal received through an antenna, to a baseband signal. For example, the RF processor 2h-10 may include a transmit filter, a receive filter, an amplifier, a mixer, an oscillator, a DAC, and an ADC. Although only a single antenna is illustrated in FIG. 15, the terminal may include multiple antennas. The RF processor 2h-10 may include a plurality of RF chains. The RF processor 2h-10 may perform beamforming. For beamforming, the RF processor 2h-10 may adjust phases and amplitudes of signals transmitted or received through multiple antennas or antenna elements. The RF processor 2h-10 may perform a MIMO operation and may receive several layers while performing the MIMO operation.

The baseband processor 2h-20 may convert between a baseband signal and a bitstream based on physical layer specifications of a system. For example, for data transmission, the baseband processor 2h-20 may generate complex symbols by encoding and modulating a transmit bitstream. For data reception, the baseband processor 2h-20 may reconstruct a received bitstream by demodulating and decoding a baseband signal provided from the RF processor 2h-10. For example, according to an OFDM scheme, for data transmission, the baseband processor 2h-20 may generate complex symbols by encoding and modulating a transmit bitstream, map the complex symbols to subcarriers, and then configure OFDM symbols by performing IFFT and CP insertion. For data reception, the baseband processor 2h-20 may split a baseband signal provided from the RF processor 2h-10, in OFDM symbol units, reconstruct signals mapped to subcarriers by performing FFT, and then reconstruct a received bitstream by demodulating and decoding the signals.

The baseband processor 2h-20 and the RF processor 2h-10 may transmit and receive signals as described above. As such, each of the baseband processor 2h-20 and the RF processor 2h-10 may also be called a transmitter, a receiver, a transceiver, or a communicator. At least one of the baseband processor 2h-20 or the RF processor 2h-10 may include multiple communication modules to support multiple different radio access technologies. Also, at least one of the baseband processor 2h-20 or the RF processor 2h-10 may include multiple communication modules to process signals of different frequency bands. For example, the different radio access technologies may include wireless LAN (For example, IEEE 802.11), a cellular network (for example, LTE), and the like. The different frequency bands may include a super high frequency (SHF) (e.g., 2.N RHz and N RHz) band and an mmWave (e.g., 60 GHz) band. The terminal may transmit/receive a signal to/and from a base station by using the baseband processor 2h-20 and RF processor 2h-10. Here, the signal may include control information and data.

The storage 2h-30 may store data for operation of the base station described above, e.g., basic programs, application programs, and configuration information. In particular, the storage 2h-30 may store information related to a second access node performing wireless communication by using a second wireless access technology. The storage 2h-30 may provide the stored data upon request by the controller 2h-40. The storage 2h-30 may be configured in a storage medium, such as ROM, RAM, a hard disk, CD-ROM, or DVD, or a combination thereof. Also, the storage 2h-30 may be configured in a plurality of memories. According to an embodiment, the storage 1h-30 may store a program for supporting beam-based cooperative communication.

The controller 2h-40 may control overall operations of the terminal. For example, the controller 2h-40 may transmit and receive signals through the baseband processor 2h-20 and the RF processor 2h-10. The controller 2h-40 may record and read data on and from the storage 2h-30. In this regard, the controller 2h-40 may include at least one processor. For example, the controller 2h-40 may include a communication processor (CP) for controlling communications and an application processor (AP) for controlling a higher layer such as an application program. According to the embodiment of the present disclosure, the controller 2h-40 includes a multi-link processor 2h-42 that performs the processing to be operated in a multi-link mode FIG. 16 is a block diagram illustrating a configuration of a main base station in a wireless communication system, according to an embodiment.

Figure 16:
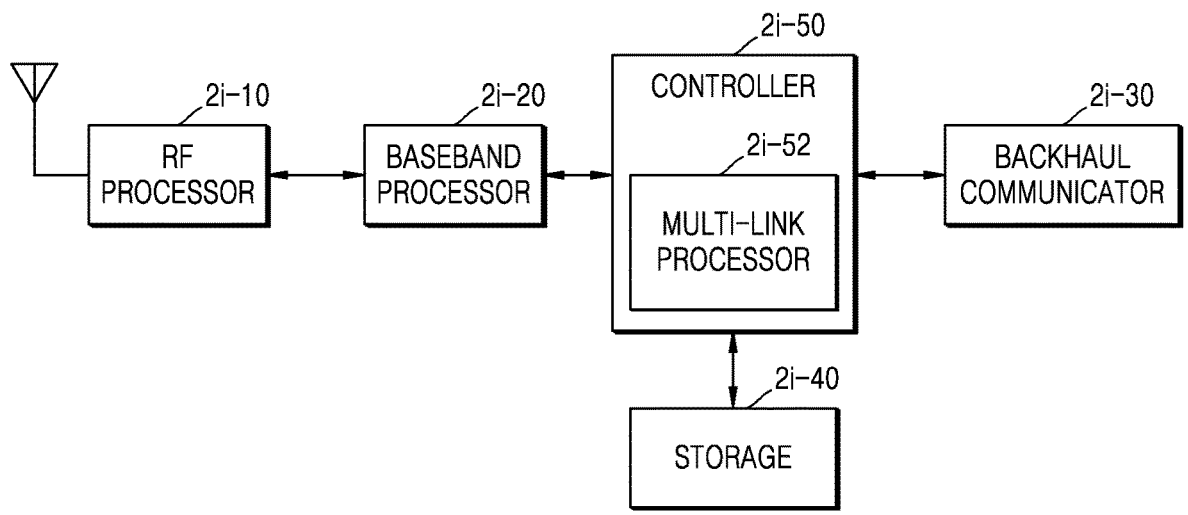
FIG. 16 is a block diagram illustrating a configuration of a base station, according to an embodiment.

Referring to FIG. 16, the base station may include an RF processor 2i-10, a baseband processor 2i-20, a backhaul communicator 2i-30, a storage 2i-40, and a controller 2i-50.

The RF processor 2i-10 may perform functions for transmitting and receiving signals through radio channels, e.g., signal band conversion and amplification. That is, the RF processor 2i-10 may up-convert a baseband signal provided from the baseband processor 2i-20, to an RF band signal and transmit the RF band signal through an antenna, and down-convert an RF band signal received through an antenna, to a baseband signal. For example, the RF processor 2i-10 may include a transmit filter, a receive filter, an amplifier, a mixer, an oscillator, a DAC, and an ADC. Although only a single antenna is illustrated in FIG. 16, the base station may include a plurality of antennas. The RF processor 2i-10 may include a plurality of RF chains. In addition, the RF processor 2i-10 may perform beamforming. For beamforming, the RF processor 2i-10 may adjust phases and amplitudes of signals transmitted or received through a plurality of antennas or antenna elements. The RF processor 2i-10 may perform a downlink MIMO operation by transmitting at least one layer.

The baseband processor 2i-20 may convert between a baseband signal and a bitstream based on physical layer specifications of a first radio access technology. For example, for data transmission, the baseband processor 2i-20 may generate complex symbols by encoding and modulating a transmit bitstream. For data reception, the baseband processor 2i-20 may reconstruct a received bitstream by demodulating and decoding a baseband signal provided from the RF processor 2i-10. For example, according to an OFDM scheme, for data transmission, the baseband processor 2i-20 generates complex symbols by encoding and modulating a transmit bitstream, maps the complex symbols to subcarriers, and then configures OFDM symbols by performing IFFT and CP insertion. For data reception, the baseband processor 2i-20 may split a baseband signal provided from the RF processor 2i-10, in OFDM symbol units, reconstruct signals mapped to subcarriers by performing FFT, and then reconstruct a received bitstream by demodulating and decoding the signals. The baseband processor 2i-20 and the RF processor 2i-10 may transmit and receive signals as described above. As such, each of the baseband processor 2i-20 and the RF processor 2i-10 may also be called a transmitter, a receiver, a transceiver, a communicator, or a wireless communicator.

The backhaul communicator 2i-30 may provide an interface for communicating with other nodes in a network. In other words, the backhaul communicator 2i-30 may convert a bit string transmitted from a main base station to another node, for example, an auxiliary base station or a core network, into a physical signal, and convert a physical signal received from the other node into a bit string.

The storage 2i-40 may store data for operation of the main base station described above, e.g., basic programs, application programs, and configuration information. In particular, the storage 2i-40 may store information about bearers allocated to a connected terminal, a measurement report transmitted from the connected terminal, etc. The storage 2i-40 may store criteria information used to determine whether to provide or release multi-connection to or from the terminal. The storage 2i-40 may provide the stored data upon request by the controller 2i-50.

The controller 2i-50 may control overall operations of the main base station. For example, the controller 2i-50 may transmit and receive signals through the baseband processor 2i-20 and the RF processor 2i-10 or through the backhaul communicator 2i-30. The controller 2i-50 may record and read data on and from the storage 2i-40. In this regard, the controller 2i-50 may include at least one processor. According to the embodiment of the present disclosure, the controller 2i-50 includes a multi-link processor 2i-52 that performs the processing to be operated in a multi-link mode The methods according to the embodiments described in the claims or the detailed description of the present disclosure may be implemented in hardware, software, or a combination of hardware and software.

When the electrical structures and methods are implemented in software, a computer-readable recording medium having one or more programs (software modules) recorded thereon may be provided. The one or more programs recorded on the computer-readable recording medium are configured to be executable by one or more processors in a device. The one or more programs include instructions to execute the methods according to the embodiments of the present disclosure described in the claims or the detailed description.

The programs (e.g., software modules or software) may be stored in random access memory (RAM), non-volatile memory including flash memory, read-only memory (ROM), electrically erasable programmable read-only memory (EEPROM), a magnetic disc storage device, compact disc-ROM (CD-ROM), a digital versatile disc (DVD), another type of optical storage device, or a magnetic cassette. Alternatively, the programs may be stored in a memory system including a combination of some or all of the above-mentioned memory devices. In addition, each memory device may be included by a plural number.

The programs may also be stored in an attachable storage device which is accessible through a communication network such as the Internet, an intranet, a local area network (LAN), a wireless LAN (WLAN), or a storage area network (SAN), or a combination thereof. The storage device may be connected through an external port to an apparatus according the embodiments of the present disclosure. Another storage device on the communication network may also be connected to the apparatus performing the embodiments of the present disclosure.

In the afore-described embodiments of the present disclosure, elements included in the present disclosure are expressed in a singular or plural form according to the embodiments. However, the singular or plural form is appropriately selected for convenience of explanation and the present disclosure is not limited thereto. As such, an element expressed in a plural form may also be configured as a single element, and an element expressed in a singular form may also be configured as plural elements.

Meanwhile, the embodiments of the present disclosure described with reference to the present specification and the drawings are merely illustrative of specific examples to easily facilitate description and understanding of the present disclosure, and are not intended to limit the scope of the present disclosure. In other words, it will be apparent to one of ordinary skill in the art that other modifications based on the technical ideas of the present disclosure are feasible. Also, the embodiments may be combined with each other as required. For example, a portion of one embodiment and a portion of another embodiment of the present disclosure may be combined with each other to enable a base station and a terminal to operate. Also, the embodiments are proposed based on a FDD LTE system, but other modifications based on technical ideas of the embodiments may be implemented on other systems, such as a TDD LTE system, a 5G or NR system, and the like.

The invention claimed is:

1. A method performed by a terminal in a wireless communication system, the method comprising:
    attempting an access to the network;
    performing an access barring check for an access category corresponding to the access;
    in case that the access is barred according to the access barring check, starting a barring timer for the access category corresponding to the access;
    in case that information on an access identity corresponding to the access and the access category is received by an access stratum (AS) layer from a non-access stratum (NAS) layer while the barring timer is running, transmitting, to the NAS layer, information indicating that the access corresponding to the access category is barred, wherein in case that the information on the access identity and the access category is not received while the barring timer is running, the information indicating that the access corresponding to the access category is barred is not transmitted to the NAS layer;
    in case that a barring of the access corresponding to the access category is alleviated, identifying whether the access corresponding to the access category was informed to the NAS layer as barred; and
    in case that the barring of the access corresponding to the access category is alleviated and the access corresponding to the access category was informed to the NAS layer as barred, informing, to the NAS layer, an alleviation of the barring of the access corresponding to the access category, wherein in case that the information indicating that the access corresponding to the access category is barred is not transmitted to the NAS layer, the alleviation of the barring of the access is not informed to the NAS layer.

2. The method of claim 1, further comprising, in case that the barring timer is running, determining that the access corresponding to the access category is barred.

3. The method of claim 1, wherein the access is attempted by the AS layer of the terminal.

4. The method of claim 3, wherein the access is attempted in response to a request to switch the terminal from an inactive mode to a connected mode.

5. The method of claim 3, wherein the access is attempted in response to a radio access network notification area update request of the terminal in the inactive mode.

6. The method of claim 3, further comprising, based on the determination of whether the access corresponding to the access category is barred, determining, by the NAS layer, whether to initiate an attempt of the access corresponding to the access category.

7. A terminal in a wireless communication system, the terminal comprising:
    a transceiver; and
    a processor coupled with the transceiver and configured to:
    attempt an access to the network,
    perform an access barring check for an access category corresponding to the access, in case that the access is barred according to the access barring check, start a barring timer for the access category corresponding to the access, in case that information on an access identity corresponding to the access and the access category is received by an access stratum (AS) layer from a non-access stratum (NAS) layer while the barring timer is running, transmit, to the NAS layer, information indicating that the access corresponding to the access category is barred, wherein in case that the information on the access identity and the access category is not received while the barring timer is running, the information indicating that the access corresponding to the access category is barred is not transmitted to the NAS layer;

in case that a barring of the access corresponding to the access category is alleviated, identify whether the access corresponding to the access category was informed to the NAS layer as barred, and in case that the barring of the access corresponding to the access category is alleviated and the access corresponding to the access category was informed to the NAS layer as barred, inform, to the NAS layer, an alleviation of the barring of the access corresponding to the access category, wherein in case that the information indicating that the access corresponding to the access category is barred is not transmitted to the NAS layer, the alleviation of the barring of the access is not informed to the NAS layer.

8. The terminal of claim 7, wherein the processor is further configured to, in case that the barring timer is running, determine that the access corresponding to the access category is barred.

9. The terminal of claim 7, wherein the access is attempted by the AS layer of the terminal.

10. The terminal of claim 9, wherein the access is attempted in response to a request to switch the terminal from an inactive mode to a connected mode.

11. The terminal of claim 9, wherein the access is attempted in response to a radio access network notification area update request of the terminal in an inactive mode.

12. The terminal of claim 9, wherein the processor is further configured, based on the determination of whether the access corresponding to the access category is barred, to determine, by the NAS layer, whether to initiate an attempt of the access corresponding to the access category.

* * * * *